(12) United States Patent
Huynh

(10) Patent No.: US 11,673,646 B2
(45) Date of Patent: Jun. 13, 2023

(54) SPOILER ACTUATION SYSTEMS AND METHODS FOR AIRCRAFT

(71) Applicant: The Boeing Company, Chicago, IL (US)

(72) Inventor: Neal V. Huynh, Bellevue, WA (US)

(73) Assignee: The Boeing Company, Arlington, VA (US)

(*) Notice: Subject to any disclaimer, the term of this patent is extended or adjusted under 35 U.S.C. 154(b) by 17 days.

(21) Appl. No.: 17/526,884

(22) Filed: Nov. 15, 2021

(65) Prior Publication Data
US 2022/0324549 A1 Oct. 13, 2022

Related U.S. Application Data

(60) Provisional application No. 63/171,869, filed on Apr. 7, 2021.

(51) Int. Cl.
*B64C 9/20* (2006.01)
*B64C 13/42* (2006.01)
(Continued)

(52) U.S. Cl.
CPC ............ *B64C 9/20* (2013.01); *B64C 13/40* (2013.01); *B64C 13/42* (2013.01); *B64C 9/323* (2013.01)

(58) Field of Classification Search
CPC .... B64C 9/16; B64C 9/18; B64C 9/20; B64C 9/323; B64C 13/40; B64C 13/42
See application file for complete search history.

(56) References Cited

U.S. PATENT DOCUMENTS 2,981,503 A * 4/1961 Goode ................ B64C 9/32
244/90 R
8,245,977 B2 * 8/2012 Binder ................ B64C 9/32
73/147

(Continued)

FOREIGN PATENT DOCUMENTS

EP 0239138 A2 9/1987
EP 3647182 A1 5/2020

OTHER PUBLICATIONS

European Patent Office, "Extended European Search Report," issued in connection with European application No. 22157054.2, dated Aug. 1, 2022, 8 pages.

Primary Examiner — Richard G Davis
(74) Attorney, Agent, or Firm — Hanley, Flight & Zimmerman, LLC

(57) ABSTRACT

An example aircraft disclosed herein includes a wing, a spoiler rotatably coupled to the wing, the spoiler movable between a cruise position and an upward position and between the cruise position and a droop position, and a spoiler actuation system coupled to a hydraulic system of the aircraft, the spoiler actuation system including a first piston and a second piston, a rack coupled between the first piston and the second piston, the rack movable between a first position and a second position, a pinion coupled to the rack, the pinion to rotate between a third position and a fourth position when the rack moves between the first position and the second position, a first crank arm coupled to the pinion, the first crank arm to rotate with the pinion between the third position and the fourth position, and a second crank arm coupled to the first crank arm and to the spoiler, the second crank arm to move the spoiler between the cruise position and the upward position when the first crank arm rotates between the third position and the fourth position.

20 Claims, 20 Drawing Sheets

(51) Int. Cl.
*B64C 13/40* (2006.01)
*B64C 9/32* (2006.01)

(56) References Cited

U.S. PATENT DOCUMENTS

| | | |
|---|---|---|
| 9,739,316 B2 | 8/2017 | Schwartz et al. |
| 10,723,441 B2 * | 7/2020 | Fox ...................... F16F 7/1005 |
| 2011/0031347 A1 | 2/2011 | Allen |
| 2022/0315204 A1 * | 10/2022 | Bishop ................... B64C 13/30 |

* cited by examiner

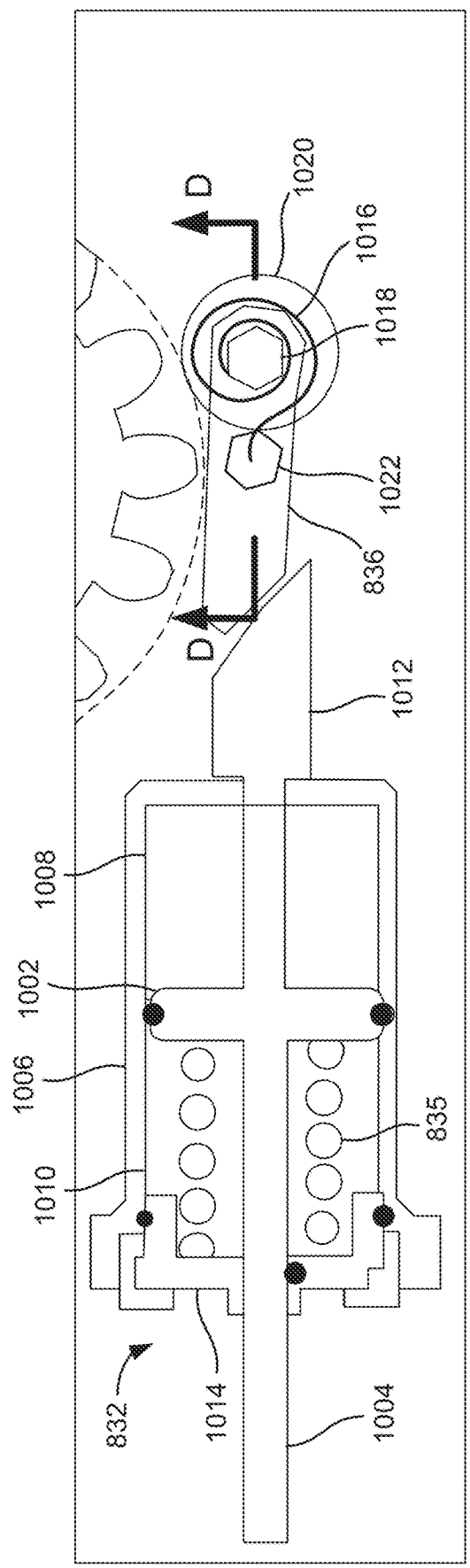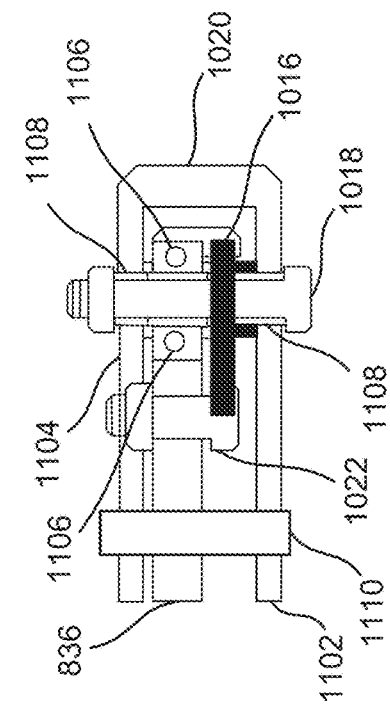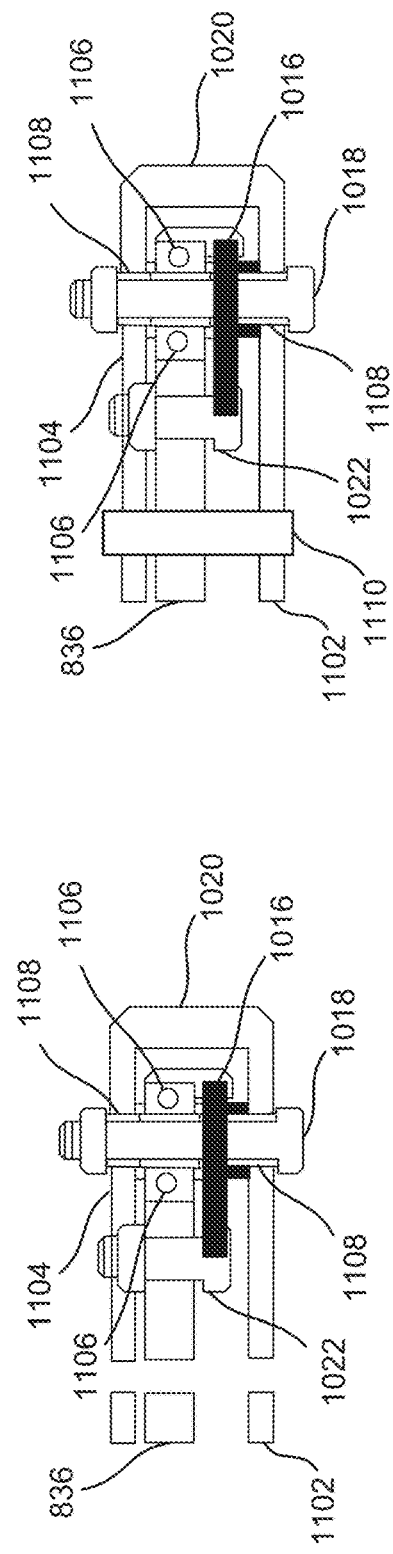
FIG. 10A
FIG. 10B
FIG. 10C

| AIRCRAFT STATE | HYDRAULIC SYSTEM STATE | AUXILIARY ACTUATOR POSITION | SPOILER POSITION |
|---|---|---|---|
| IN FLIGHT | ON AND PRESSURE NORMAL | RETRACTED | POSITION IS CONTROLLED BY THE FCE / REU COMMAND. THE EHSV CONTROLS FLUID TO AND FROM THE FIRST AND SECOND PISTONS TO RAISE AND LOWER THE SPOILER AND/OR TO HOLD THE SPOILER IN SELECTED POSITIONS. |
| IN FLIGHT | ON AND PRESSURE BELOW NORMAL | EXTENDED | LEVER PREVENTS UPWARD TRAVEL OF SPOILER. |
| IN FLIGHT | FAILS | EXTENDED | LEVER PREVENTS UPWARD TRAVEL OF SPOILER AND PREVENTS SPOILER TO BE LIFTED UP BY AERODYNAMIC FORCE. |
| ON GROUND | ON AND PRESSURE NORMAL | EXTENDED | LEVER AND HANDLE LOCK PINION AND SPOILER IN CRUISE POSITION. MAINTENANCE PERSONNEL CAN SAFELY WORK NEAR SPOILER. |

FIG. 13

SPOILER ACTUATION SYSTEMS AND METHODS FOR AIRCRAFT

RELATED APPLICATION

This patent arises from a continuation of U.S. Patent Application No. 63/171,869, which was filed on Apr. 7, 2021. U.S. Patent Application No. 63/171,869 is hereby incorporated herein by reference in its entirety. Priority to U.S. Patent Application No. 63/171,869 is hereby claimed.

FIELD OF THE DISCLOSURE

This disclosure relates generally to aircraft and, more particularly, to spoiler actuation systems and methods for aircraft.

BACKGROUND

Aircraft typically employ spoilers along the top portion of a wing body. The spoilers can be used to slow down the aircraft or cause the aircraft to descend. The spoilers can also be drooped to functionally replace a fore flap of the wing body and maintain a gap and an overlap with a trailing edge flap of the wing body. Actuation systems for controlling the spoilers are housed in the wing body. Further, a spar box inside the wing body can store fuel for the aircraft. Increasing a size of the spar box increases the amount of fuel that can be stored therein and, thus, improves the performance range of the aircraft. The size of the spar box is limited by the size and arrangement of the actuation systems contained in the wing body. Additionally, the performance range of the aircraft is based on a size of fairings coupled to the wing body and/or based on drag caused by spoiler float during flight of the aircraft.

SUMMARY

An example aircraft disclosed herein includes a wing, a spoiler rotatably coupled to the wing, the spoiler movable between a cruise position and an upward position and between the cruise position and a droop position, and a spoiler actuation system coupled to a hydraulic system of the aircraft. The spoiler actuation system includes a first piston and a second piston, and a rack coupled between the first piston and the second piston. The rack is movable between a first position and a second position. A pinion is coupled to the rack, the pinion to rotate between a third position and a fourth position when the rack moves between the first position and the second position. A first crank arm is coupled to the pinion, the first crank arm to rotate with the pinion between the third position and the fourth position. A second crank arm is coupled to the first crank arm and to the spoiler. The second crank arm is to move the spoiler between the cruise position and the upward position when the first crank arm rotates between the third position and the fourth position.

An example method disclosed herein includes receiving a command signal from flight control electronics (FCE) of an aircraft at a remote electronic unit (REU). In response to receiving the command signal at the REU, a servo-valve switches from a neutral state to a first state or from the neutral state to a second state via a control signal from the REU. In response to the servo-valve switching to the second state, hydraulic fluid is provided from the servo-valve to a piston coupled to a rack, the rack to move from a first position to a second position in response to the providing of the hydraulic fluid to the piston. A pinion is rotated from a third position to a fourth position when the rack moves from the first position to the second position, the pinion to cause corresponding rotation of a first crank arm. A second crank arm is rotated and is coupled to the first crank arm, and a spoiler of the aircraft moves from a cruise position to an upward position when rotating the second crank arm.

An example apparatus disclosed herein includes a first piston and a second piston, and a rack coupled between the first piston and the second piston. The rack is movable between a first position and a second position within a cylinder. A pinion is coupled to the rack, the pinion to rotate between a third position and a fourth position when the rack moves between the first position and the second position. A first crank arm is coupled to the pinion, the first crank arm to rotate with the pinion between the third position and the fourth position. A second crank arm is coupled to the first crank arm and to a spoiler of an aircraft, the second crank arm to move the spoiler between a cruise position and an upward position when the pinion rotates between the third position and the fourth position.

BRIEF DESCRIPTION OF THE DRAWINGS

FIG. 10A is a detailed view of an example auxiliary actuator and an example locking lever of the example spoiler actuation system of FIGS. 8A, 8B, and/or 9.

FIG. 10B a cross-sectional view of the example locking lever of FIG. 10A taken along line D-D of FIG. 10A.

FIG. 10C illustrates the example locking lever of FIGS. 10A and/or 10B including an example safety pin.

FIG. 13 is an example table representing positions of the example spoiler and the example auxiliary actuator for corresponding states of the example hydraulic system of FIGS. 8A, 8B, 9, 11, and/or 12.

Figure 1:
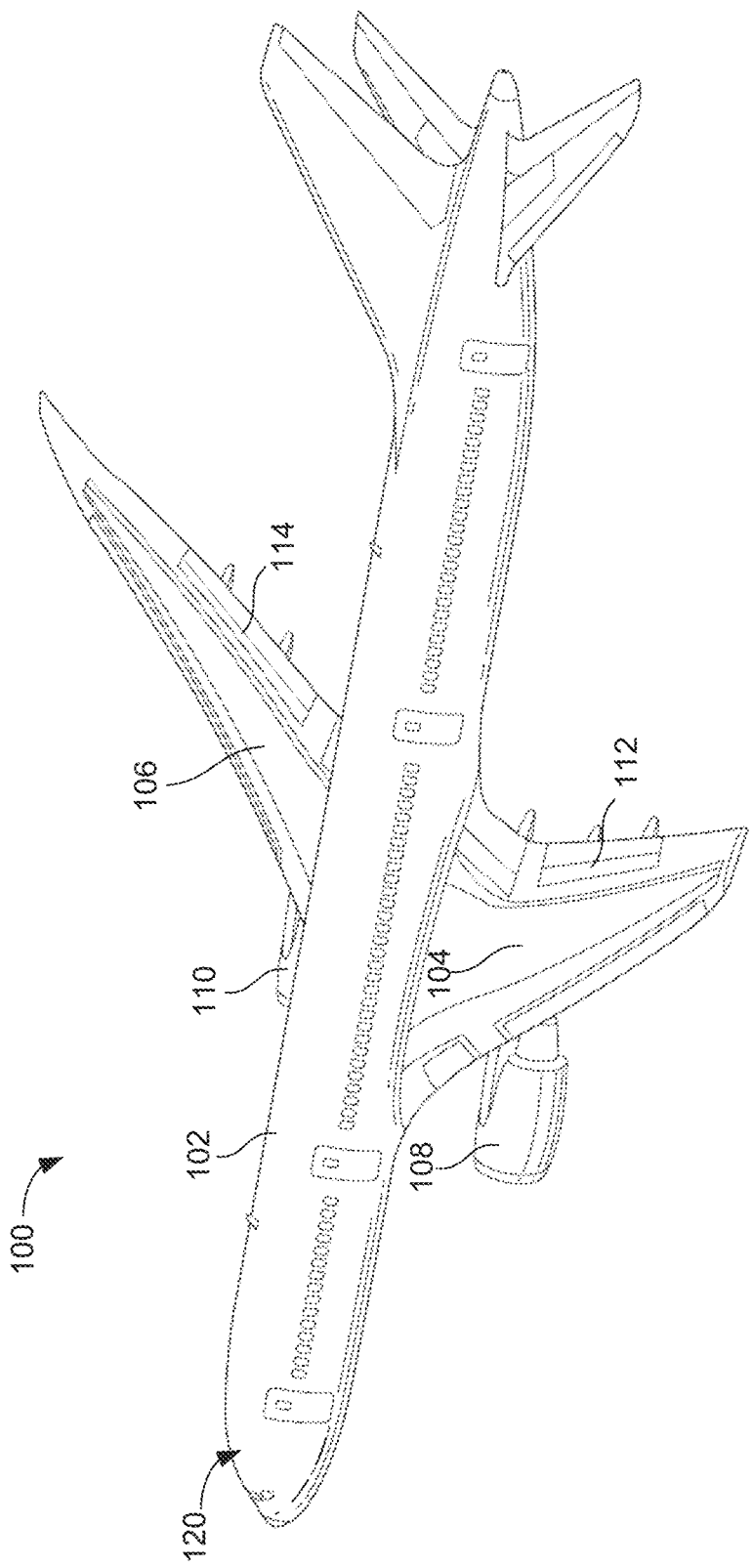
FIG. 1 illustrates an example aircraft in which examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Disclosed herein are example spoiler actuation systems and methods for aircraft. In many aircraft, wings are designed to store fuel used to power the aircraft during operation. The fuel is typically stored inside a spar box located inside the wing, where the spar box is defined by a front spar and a rear spar positioned near the front of the wing and the rear of the wing, respectively. A size of the spar box can be increased by moving the front spar and/or the rear spar closer to the respective ends of the wing. Increasing the size of the spar box increases fuel carrying capacity of the aircraft, thereby increasing flight range of the aircraft. In many cases, the size of the spar box is limited by the available space inside the wing. In particular, space outside of the rear spar may be occupied by other components of the aircraft, such as components used to control actuation of a spoiler. Such components may limit the size of the spar box by preventing positioning of the rear spar closer to the rear edge of the wing.

Aircraft typically employ spoilers near the top rear edge of the wings. The spoilers can be deployed during flight to slow down the aircraft and/or cause the aircraft to descend. Spoiler actuation systems typically utilize a combination of electrical components and hydraulic components to rotate the spoiler between a cruise position (e.g., down position) and an upward position (e.g., extended position). The spoiler typically rotates with respect to a surface of the wings along a plane perpendicular to the surface. In some known spoiler actuation systems, a linear actuator extends and/or rotates in the same plane as the spoiler. To implement such known spoiler actuation systems in the wings, sufficient space inside the wings is required to accommodate the linear and/or rotary travel of the linear actuator and the spoiler. As such, reduced space is available for implementing the spar box inside the wing. Furthermore, in some known spoiler actuation systems, a linear position sensor implemented therein does not have the accuracy required for spoiler position control.

Some known spoiler actuation systems are operatively coupled to a hydraulic system of the aircraft. Fluid from the hydraulic system enters the spoiler actuation system to control a position of the spoiler. In some instances, when failure of the hydraulic system occurs and/or a pressure of the fluid is below a pressure threshold, the spoiler actuation system uses residual hydraulic pressure to hold the spoiler at the cruise position. In some such instances, fluid leakage in the spoiler actuator system can occur, thus causing the spoiler to float upward. Such spoiler float produces drag during flight of the aircraft and reduces performance range of the aircraft. Furthermore, the drag is based on a size and/or number of fairings coupled to the aircraft.

Example spoiler actuation systems disclosed herein reduce the space required for implementation within the wing, thus enabling the size of the spar box to be increased. In examples disclosed herein, the spoiler rotates in a first plane, and the linear actuator is configured to extend and/or rotate in a second plane perpendicular to the first plane. In such examples, linear travel of the linear actuator causes rotation of the spoiler via a first crank, a rod, and a second crank coupled therebetween. In particular, a rack inside a cylinder of the linear actuator engages with a pinion coupled to the first crank, such that linear travel of the rack causes rotation of the pinion and, thus, the first crank.

In examples disclosed herein, the linear travel of the linear actuator is controllable via a servo-valve coupled to a hydraulic system of the aircraft. The servo-valve provides hydraulic fluid between two chambers inside the cylinder, where the hydraulic fluid applies pressure on pistons coupled at each end of the rack to move the rack within the cylinder. In examples disclosed herein, the servo-valve is controllable via one or more control signals from a remote electronics unit (REU). The REU sends the one or more control signals based on measurement data from a sensor coupled to the pinion, and further based on a command signal received from flight control electronics (FCE) of the aircraft. Rotation of the pinion is measured by a rotary sensor (e.g., a resolver) having increased accuracy compared to a linear position sensor. Accordingly, spoiler position control is more accurate using the rotary sensor compared to the linear position sensor. In examples disclosed herein, a mechanical locking mechanism including an auxiliary actuator and a spring-biased lever are positioned proximate the pinion. In some examples, the auxiliary actuator and the lever prevent upward travel of the spoiler during abnormal operating conditions of the hydraulic system (e.g., below a threshold pressure). The mechanical locking mechanism is not affected by disadvantages of hydraulic characteristics such as hydraulic leakage.

FIG. 1 illustrates an example aircraft 100 in which examples disclosed herein can be implemented. In the illustrated example, the aircraft 100 includes a fuselage 102, a left wing 104 coupled to the fuselage 102, and a right wing 106 coupled to the fuselage 102. The aircraft 100 also includes a first engine 108 coupled to the left wing 104 and a second engine 110 coupled to the right wing 106. In other examples, the aircraft 100 may have multiple engines coupled to each of the left and right wings 104, 106 and/or disposed in other locations on the aircraft 100 (e.g., coupled to the fuselage 102, coupled to a tail section of the aircraft 100, etc.). In addition to producing thrust, each of the engines 108, 110 drives one or more engine driven pumps for producing pressurized hydraulic fluid for use by one or more systems of the aircraft 100. Further, each of the engines 108, 110 drives one or more generators for producing electrical power for use by one or more electrical motor pumps for producing pressurized hydraulic fluid for use by one or more hydraulic systems of the aircraft 100.

The left and right wings 104, 106 may have one or more control surfaces located near the trailing edges of the left and right wings 104, 106. Such control surfaces can be used to control air flow around the left and right wings 104, 106 to change aerodynamic drag and lift on the aircraft 100. For example, in FIG. 1, the aircraft 100 includes an example left spoiler 112 coupled to the left wing 104 and an example right spoiler 114 coupled to the right wing 106. The spoilers 112, 114 are typically deployed during landing or during descent of the aircraft 100 to slow down the aircraft 100 and/or cause the aircraft 100 to move in a downward direction. While in the illustrated example of FIG. 1, the left and right wings 104, 106 each include one spoiler, in other examples, the left and right wings 104, 106 can include multiple spoilers. Each of the spoilers 112, 114 is controllable via one or more spoiler actuation systems, as disclosed in further detail herein.

Each of the spoilers 112, 114 is movable between a cruise position (e.g., retracted position, down position, stowed position) and an upward position (e.g., deployed position, extended position). In the cruise position, the spoilers 112, 114 are generally aligned with the respective left and right wings, 104, 106, as shown in FIG. 1. During cruise, for example, the spoilers 112, 114 are typically held in the cruise position, which is more aerodynamic and fuel efficient. In the upward position, the spoilers 112, 114 are tilted and/or otherwise moved upward relative to the respective left and right wings 104, 106. For example, during landing, the spoilers 112, 114 can be deployed, which disturbs the air flow over the left and right wings 104, 106 to increase drag on the aircraft 100 and, in turn, reduce lift and cause the aircraft 100 to descend. The aircraft 100 also includes a cockpit 120 with controls that the pilot(s) can use to control the spoilers 112, 114. For example, the cockpit 120 includes one or more spoiler control inceptors for controlling the positions of the spoiler 112, 114, and one or more engine thrust control inceptors for controlling thrust produced by the engines 108, 110.

Figure 2A:
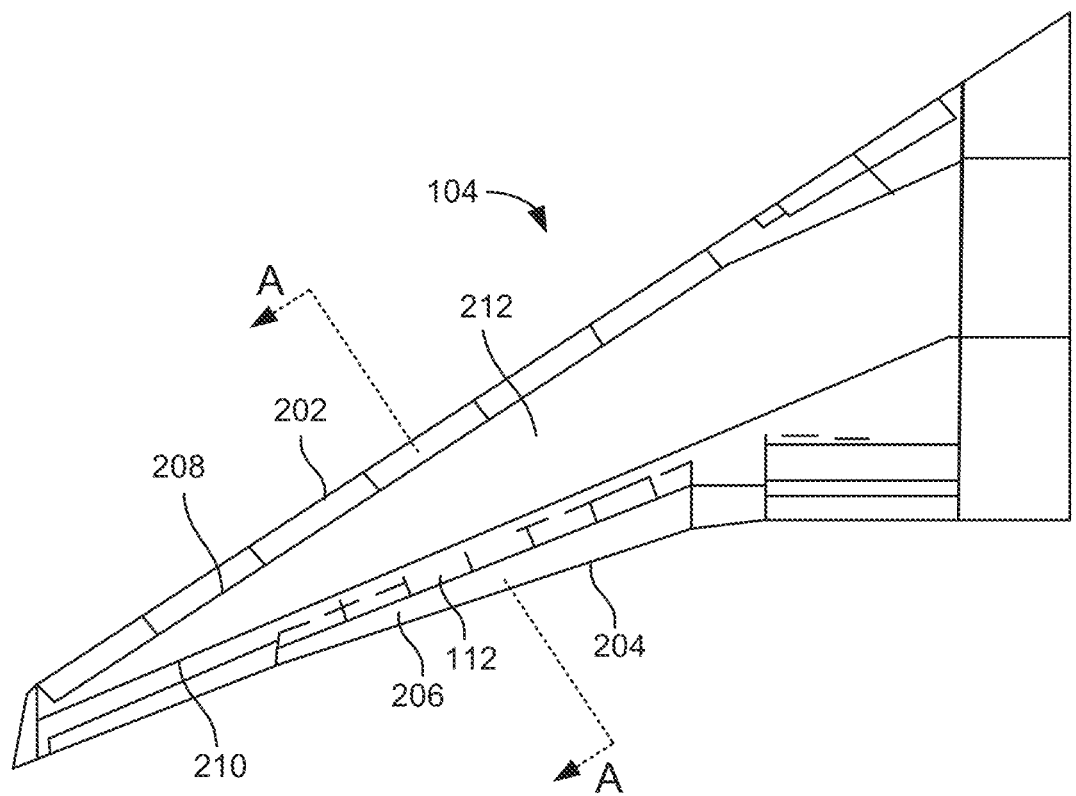
FIG. 2A is a top view of an example wing body from the example aircraft of FIG. 1.

FIG. 2A illustrates a top view of the example left wing (e.g., wing) 104 from the example aircraft 100 of FIG. 1. The right wing 106 of FIG. 1 is substantially the same as the left wing 104. Thus, any of the examples disclosed in connection with the left wing 104 can likewise apply to the right wing 106. The left wing 104 includes the example left spoiler (e.g., spoiler) 112, an example leading edge 202, an example trailing edge 204, an example flap (e.g., outboard flap) 206, an example front spar 208, and an example rear spar 210. While the aircraft 100 is in flight, air passes over and under the wing 104 from the leading edge 202 to the trailing edge 204 to produce aerodynamic lift on the wing 104.

In the illustrated example of FIG. 2A, the example spoiler 112 and the example flap 206 are positioned at or near the trailing edge 204. Both the spoiler 112 and the flap 206 can be used to control the lift on the aircraft 100. For example, the flap 206 can be moved relative to the trailing edge 204 to change the shape of the wing 104 and generate more or less lift. In some examples, the flap 206 is controllable via a flap actuation system communicatively coupled to the cockpit 120 of FIG. 1. In some examples, the wing 104 can include multiple ones of the flap 206 and/or the spoiler 112.

In the illustrated example of FIG. 2A, the example front spar 208 and the example rear spar 210 are positioned inside the wing 104 between the leading edge 202 and the trailing edge 204. The front and rear spars 208, 210 define an example spar box (e.g., fuel storage) 212 therebetween and which is used to store fuel for use by the aircraft 100. Increasing a size of the spar box 212 increases the amount of fuel that can be stored therein. For example, the size of the spar box 212 can be increased by positioning the front spar 208 and the rear spar 210 closer to the leading edge 202 and the trailing edge 204, respectively. In some examples, spoiler actuation systems for actuating the spoiler 112 are located inside the wing 104 between the rear spar 210 and the trailing edge 204. In such examples, the spoiler actuation systems may prevent positioning of the rear spar 210 closer to the trailing edge 204, thereby reducing space available for the spar box 212. Examples disclosed herein reduce an area of the wing 104 required for actuating the spoiler 112, thus allowing the rear spar 210 to be positioned closer to the trailing edge 204.

Figure 2B:
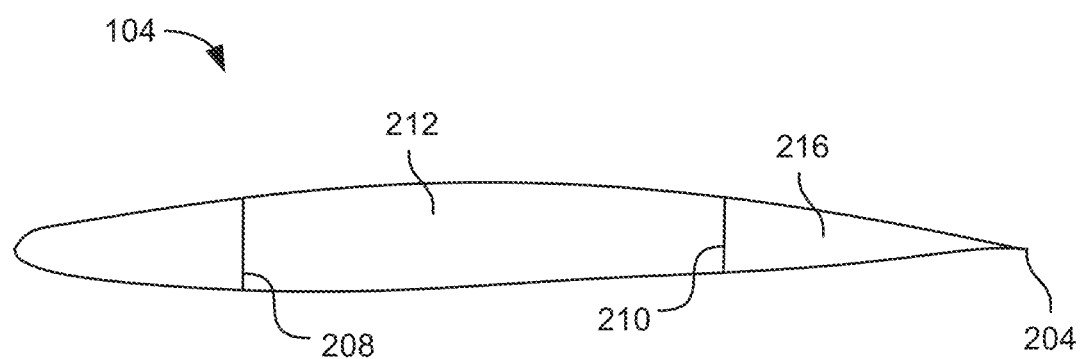
FIG. 2B is a cross-sectional view of the example wing body of FIG. 2A taken along line A-A of FIG. 2A.

FIG. 2B is an example cross-sectional view of the example wing 104 of FIG. 2A taken along line A-A of FIG. 2A. In the illustrated example, the front spar 208 and the rear spar 210 define the spar box 212 of FIG. 2A. Further, the rear spar 210 and the trailing edge 204 define an example area 216 therebetween for housing components of a spoiler actuation system. In some examples, a size of the spar box 212 is limited by the area 216 required for implementing the spoiler actuation system and/or other actuation systems of the aircraft 100. An example spoiler actuation system described herein reduces the area 216 required for implementation compared to known spoiler actuation systems relative to the prior art, thereby increasing an amount of fuel that can be stored in the spar box 212.

Figure 3A:
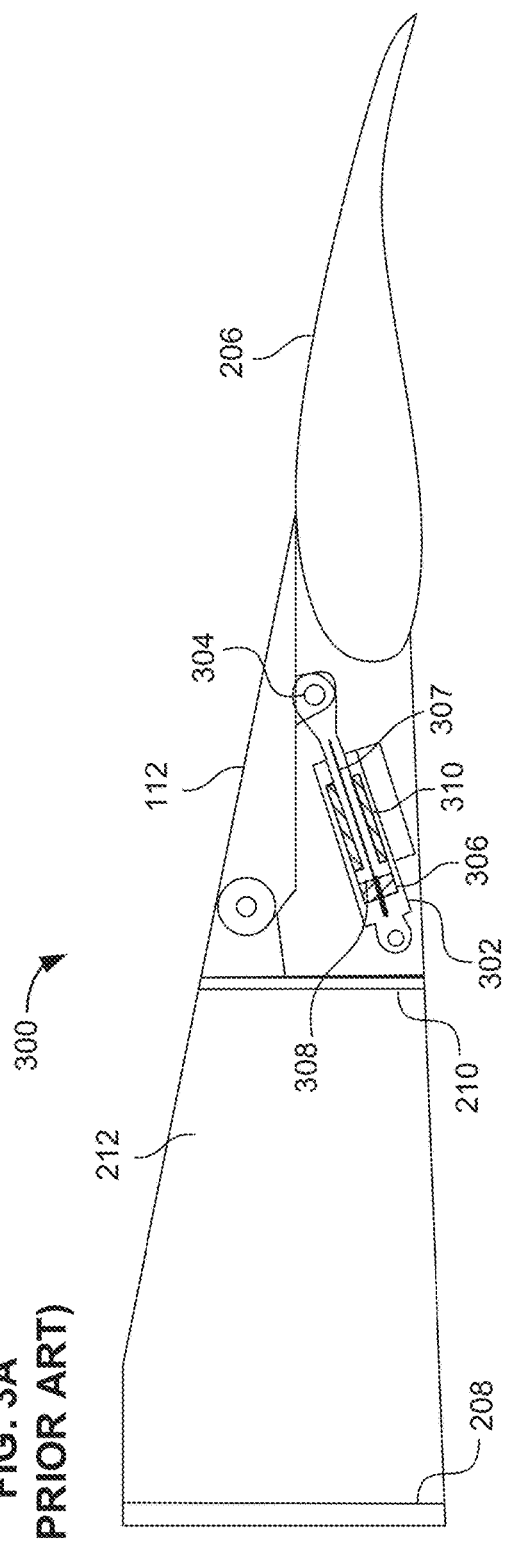
FIG. 3A illustrates a first solution for spoiler actuation with actuator and spoiler retracted.

FIG. 3A illustrates a first known spoiler actuation system 300 from prior art, implemented on the wing 104 with the spoiler 112 of FIGS. 1 and 2A retracted (e.g., in the cruise position). The first known spoiler actuation system 300 includes the front spar 208 and rear spar 210 defining the spar box 212 of FIGS. 2A and 2B, and the flap 206 of FIG. 2A. The first known spoiler actuation system 300 further includes an actuator 302 coupled to the spoiler 112 at a first joint 304. The actuator 302 extends when hydraulic fluid enters a first chamber 306 and applies pressure on a piston 308 of the actuator 302 in an outward direction. Conversely, the actuator 302 retracts when the hydraulic fluid enters a second chamber 310 and applies pressure on the piston 308 in an inward direction opposite the outward direction. In this example, an example linear position sensor 307 measures a linear position of the piston 308. The actuator 302 is operatively coupled to a hydraulic system of the aircraft 100 and controllable from the cockpit 120 of FIG. 1 via electrical signals. For example, the electrical signals can open or close one or more valves (e.g., servo-valves) of the hydraulic system to selectively direct the hydraulic fluid between the first and second chambers 306, 310. In some examples, electrical signals from the linear position sensor 307 are used to control the linear position of the piston 308, where the linear position of the piston 308 corresponds to a position of the spoiler 112.

Figure 3B:
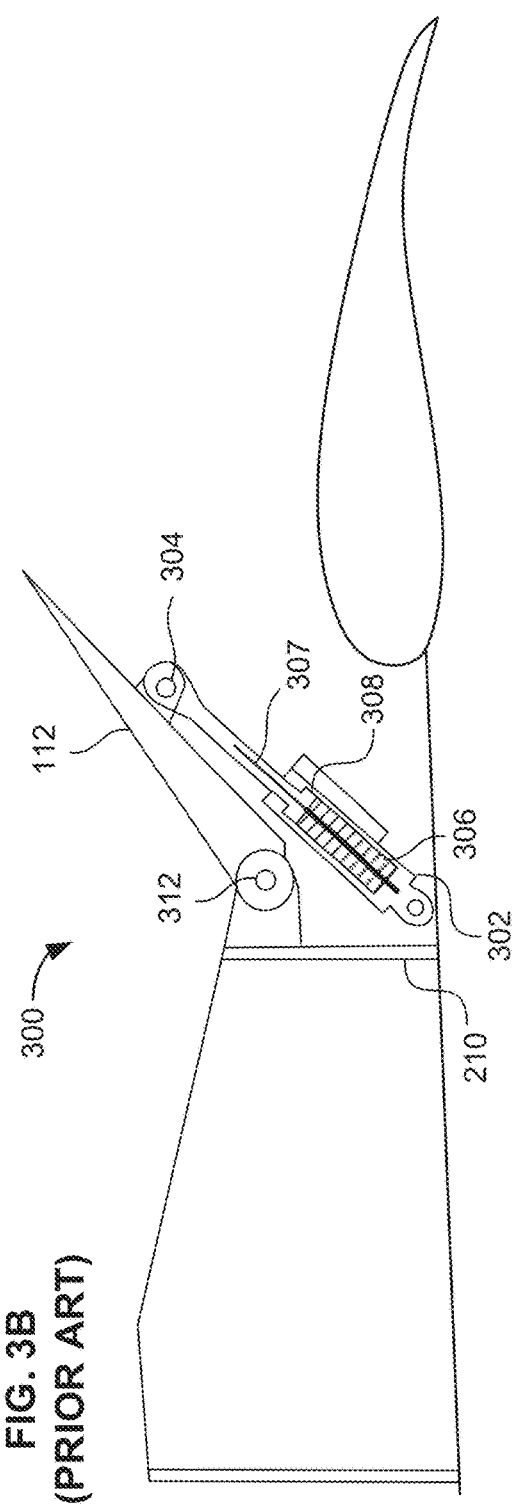
FIG. 3B illustrates the first solution for spoiler actuation of FIG. 3A with the actuator and the spoiler extended.

FIG. 3B illustrates the first known actuation system 300 of FIG. 3A with the spoiler 112 extended (e.g., in the upward position). In the illustrated example, the spoiler 112 is rotatable about a second joint 312 at which the spoiler 112 is coupled to the rear spar 210. In response to receiving a first electrical signal from the cockpit 120, the hydraulic system causes hydraulic fluid to flow into the first chamber 306 of the actuator 302. In this example, the hydraulic fluid generates hydraulic pressure on the piston 308 in the outward direction and, thus, causes the actuator 302 to extend. When the actuator 302 extends, the actuator 302 applies a force to the first joint 304 and causes the spoiler 112 to rotate about the second joint 312 to the upward position. In some examples, the spoiler 112 in the upward position enables the aircraft 100 of FIG. 1 to descend.

Figure 4A:
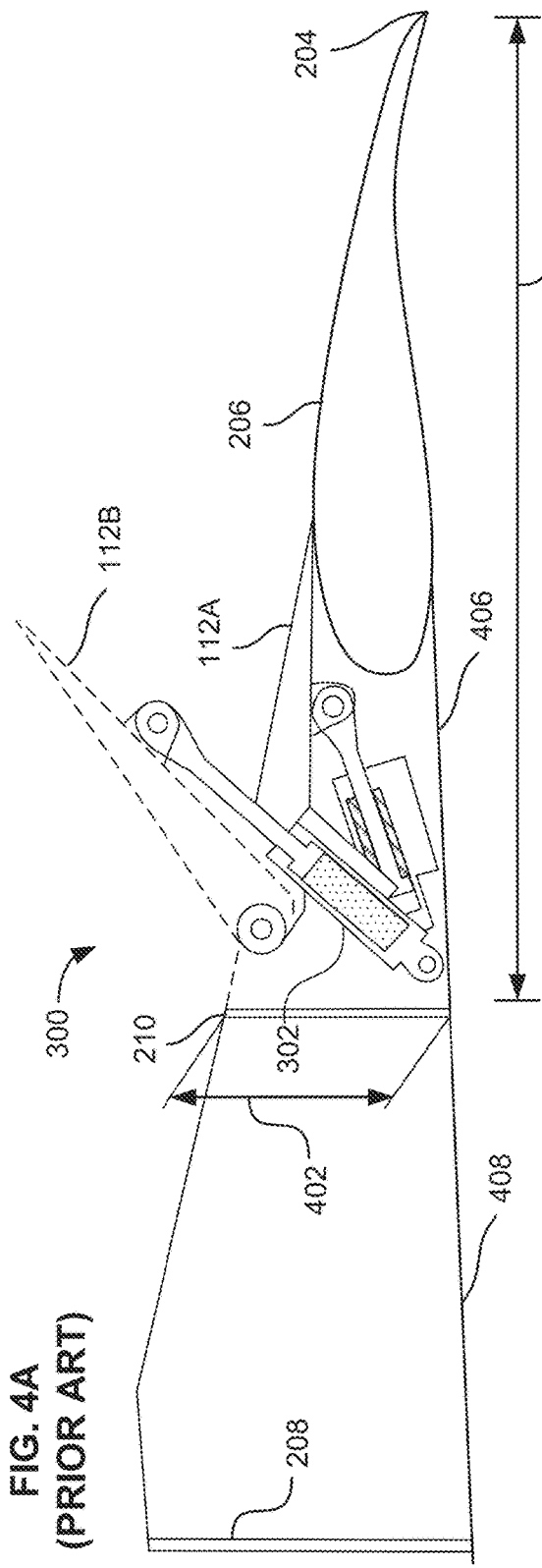
FIG. 4A illustrates a second solution for spoiler actuation with actuators and spoiler extended.

FIG. 4A illustrates the example first known actuation system 300 of FIGS. 3A and/or 3B with the spoiler 112 shown in both a cruise position 112A and an upward position 112B. In the illustrated example of FIG. 4A, the rear spar 210 has a first length 402 and is positioned at a first distance 404 from the trailing edge 204 of the wing 104. In this example, the first known actuation system 300 is located above an example outer mold line 406 of the wing 104. As such, a bottom surface 408 of the wing 104 is relatively smooth (e.g., without significant cavities or protrusions) along a length of the wing 104 between the front spar 208 and the flap 206.

Figure 4B:
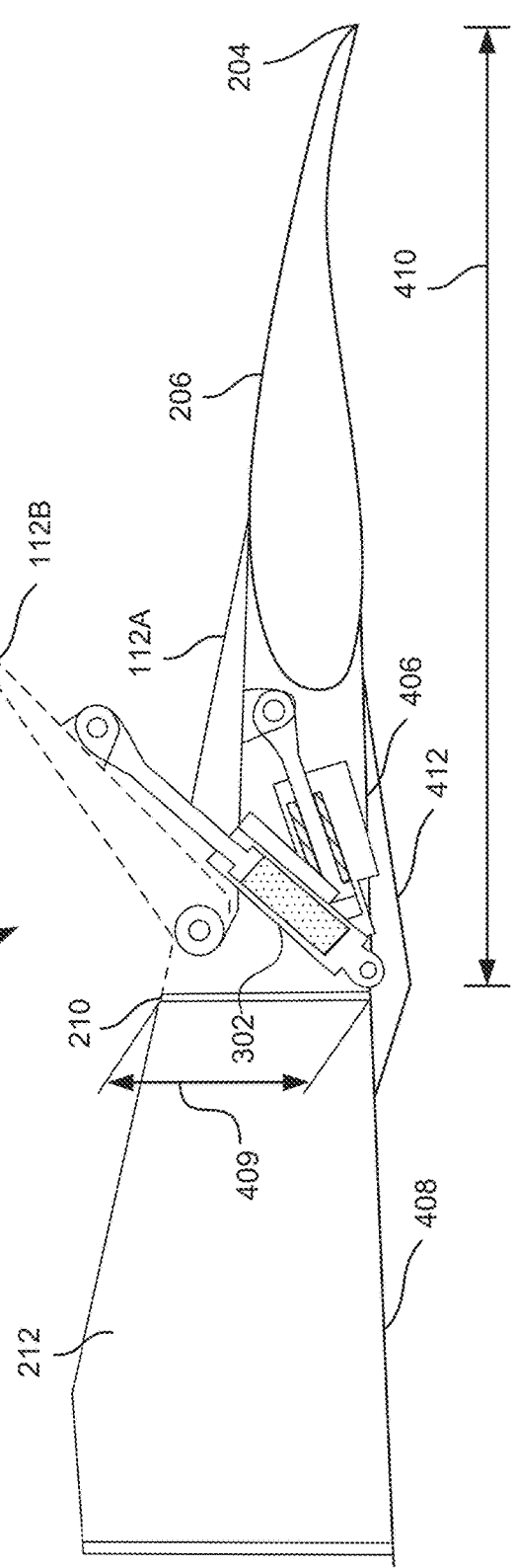
FIG. 4B illustrates the second solution for spoiler actuation of FIG. 4A with a change in location of a rear spar.

FIG. 4B illustrates an example second known actuation system 400 with the spoiler 112 shown in both the cruise position 112A and the upward position 112B. The second known actuation system 400 is substantially the same as the first known actuation system 300, but enables an increase in size of the spar box 212. For example, in the illustrated example of FIG. 4B, the rear spar 210 has a second length 409 and is positioned at a second distance 410 from the trailing edge 204. In this example, the second length 409 is smaller compared to the first length 402 of FIG. 4A, and the second distance 410 is smaller compared to the first distance 404 of FIG. 4A. By positioning the rear spar 210 in this example rearward compared to the illustrated example of FIG. 4A, the size of the spar box 212 for the second known actuation system 400 is increased. As such, the second known actuation system 400 enables more fuel to be stored in the spar box 212, thereby increasing a range of the aircraft 100 of FIG. 1.

However, to allow positioning of the rear spar 210 closer to the trailing edge 204 while enabling travel of the spoiler 112 between the cruise and extended positions 112A, 112B, the actuator 302 of the second known actuation system 400 is positioned below the outer mold line 406. In such an example, an example fairing (e.g., aerodynamic fairing) 412 is coupled to the bottom surface 408 to house and/or cover the actuator 302. The fairing 412 protrudes from the bottom surface 408, such that the bottom surface 408 is not smooth (e.g., compared to FIG. 4A). The fairing 412 increases drag on the wing 104, thus reducing aerodynamic efficiency of the aircraft 100.

Figure 5:
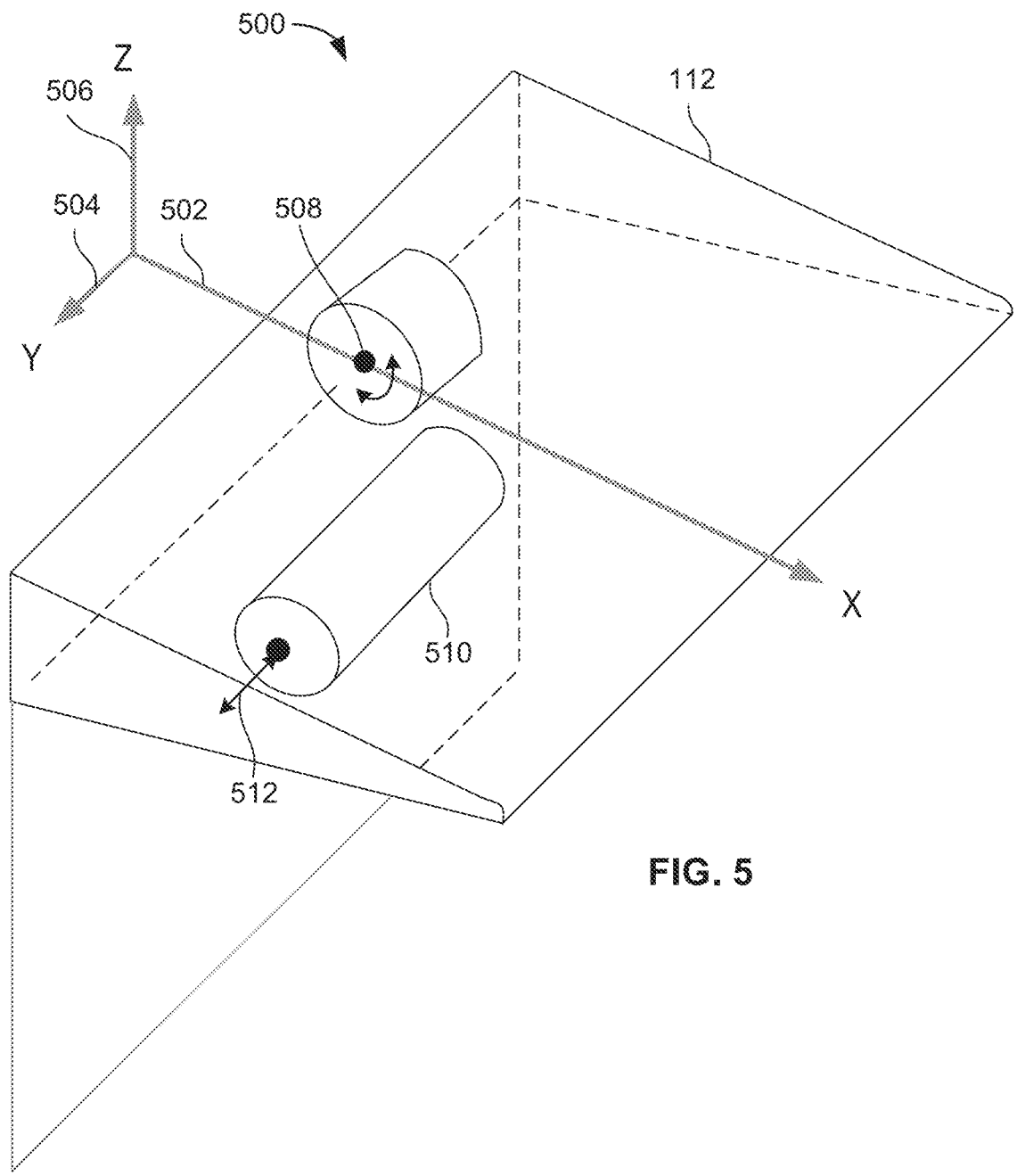
FIG. 5 is a schematic of an example diagram for spoiler actuation implemented in examples disclosed herein.

FIG. 5 is a schematic of an example diagram 500 for spoiler actuation implemented in examples disclosed herein. In the illustrated example of FIG. 5, the example spoiler 112 is oriented along a horizontal plane (e.g., x-y plane) defined by an example x-axis (e.g., first axis) 502 and an example y-axis (e.g., second axis) 504. An example z-axis (e.g., third axis) 506 is orthogonal to the x-axis 502 and the y-axis 504. To move between the upward position and the cruise position, the spoiler 112 rotates about an example rotation axis 508 in an x-z plane defined by the x-axis 502 and the z-axis 506. In the first and second known actuation systems 300, 400 of FIGS. 4A and 4B, respectively, the actuator 302 similarly extends and/or rotates in the x-z plane. Thus, to allow linear travel of the actuator 302, the first and second known actuation systems 300, 400 require an increased space available along the x-axis 502 in the wing 104 for implementation therein.

The example diagram 500 illustrated in FIG. 5 orients an example linear actuator 510 such that the linear travel of the linear actuator 510 occurs in a y-z plane defined by the y-axis 504 and the z-axis 506. In this example, the linear travel of the linear actuator 510 along an example linear travel path 512 causes corresponding rotation of the spoiler 112 about the rotation axis 508 between the upward and cruise positions. Accordingly, by reducing linear travel along the x-axis 502, the space required along the x-axis 502 is reduced and the rear spar 210 of the wing 104 can be positioned rearward at the second distance 410 from the trailing edge 204 (e.g., as shown in the illustrated example of FIG. 4B). Furthermore, as a result of the linear travel occurring in the y-z plane instead of the x-z plane, the rear spar 210 can be positioned rearward without requiring implementation of the fairing 412 of FIG. 4B to accommodate the linear travel. As such, implementing the system in the diagram 500 for spoiler actuation allows the size of the spar box 212 and, thus, the amount of fuel stored therein, to be increased while maintaining aerodynamic efficiency of the aircraft 100.

Figure 6:
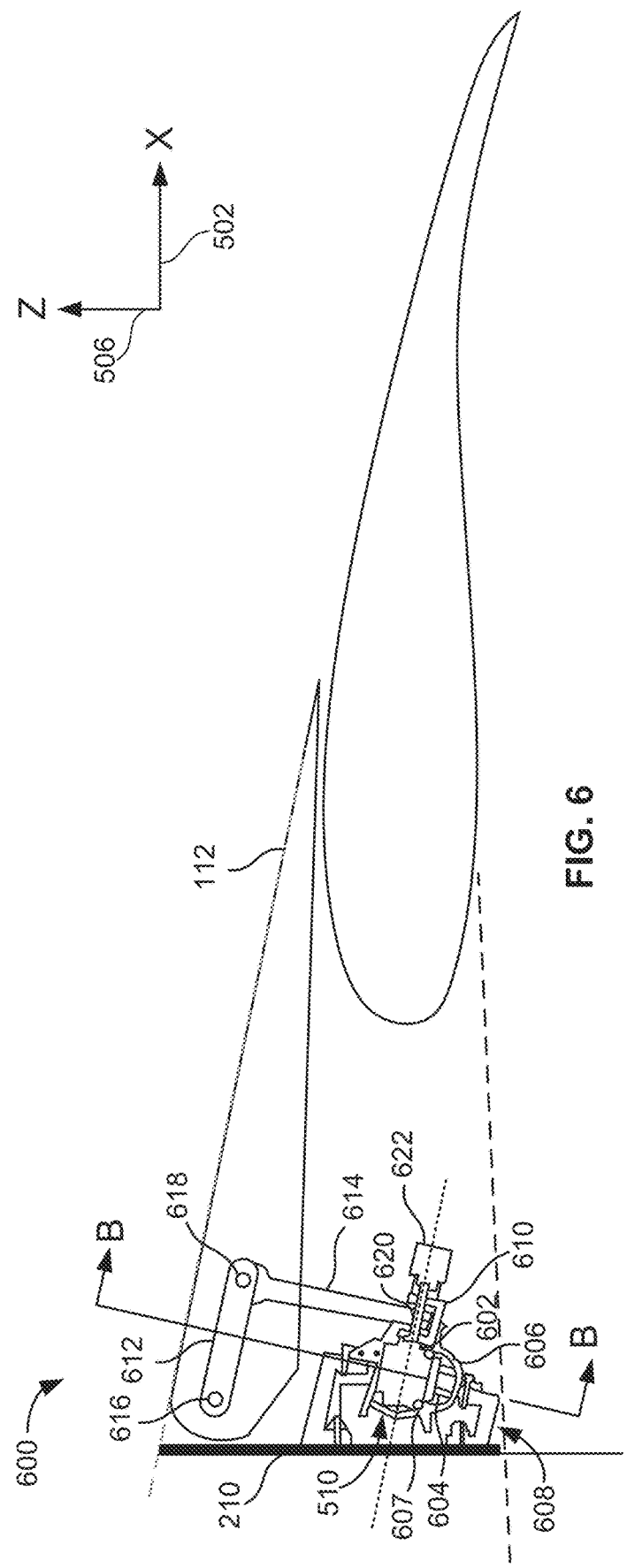
FIG. 6 is an internal view of an example spoiler actuation system for an aircraft flight control actuator (e.g., spoiler, aileron, flaperon, rudder, elevator, etc.) in accordance with examples disclosed herein, with the spoiler in a cruise position.

FIG. 6 is an internal view of an example spoiler actuation system 600 in accordance with examples disclosed herein, with the spoiler 112 in a cruise position. In the illustrated example of FIG. 6, the spoiler actuation system 600 includes the linear actuator 510 including an example pinion 602 operatively coupled to an example rack 604. The rack 604 is configured to translate relative to the pinion 602. The pinion 602 and the rack 604 are housed within an example cylinder (e.g., hydraulic cylinder) 606, with example bearings 607 operatively coupled between the rack 604 and the cylinder 606 to enable the rack 604 to slide within the cylinder 606. In this example, the rack 604 slides in a direction along the y-axis 504 (not shown) oriented out of the page in FIG. 6. In this example, an example hydraulic control module (HCM) 608 is operatively coupled to the cylinder 606 to control flow of one or more fluids therein from a hydraulic system of the aircraft 100. In this example, the HCM 608 is fixedly coupled to the rear spar 210.

In the illustrated example of FIG. 6, the spoiler actuation system 600 further includes an example first crank 610 coupled to the pinion 602. The first crank 610 rotates with the pinion 602. The first crank 610 is coupled to an example second crank 612 via an example rod (e.g., push rod) 614 rotatably coupled therebetween. The second crank 612 is substantially aligned with and rotates with the spoiler 112. In particular, the second crank 612 and the spoiler 112 rotate about an example first joint 616 to move the spoiler 112 between the cruise and upward positions. The rod 614 rotates relative to the second crank 612 at an example second joint 618, and rotates relative to the first crank 610 at an example third joint 620. In this example, the first joint 616 is at a fixed location, and the second and third joints 618, 620 are movable.

In this example, the HCM 608 directs hydraulic fluid between one or more chambers of the cylinder 606. In some examples, the hydraulic fluid generates hydraulic pressure within the one or more chambers, and the hydraulic pressure causes the rack 604 to slide within the cylinder 606 between a first position and a second position. In this example, the rack 604 is in the first position. When the rack is in the first position, the pinion 602 is oriented such that the first crank 610 is substantially parallel to the y-axis 504 (e.g., oriented out of the page in FIG. 6). In such examples, the rod 614 holds the second crank 612 and, thus, the spoiler 112, in the cruise position.

In this example, the spoiler actuation system 600 further includes an example rotary position sensor 622 coupled to the first crank 610 and/or to the pinion 602. The rotary position sensor 622 is used to meet an accuracy requirement associated with a position of the spoiler 112, and the rotary position sensor 622 is configured to measure rotary travel of the first crank 610 and/or the pinion 602. Additionally or alternatively, the rotary position sensor 622 can be configured as a linear position sensor (e.g., the linear position sensor 307 of FIGS. 3A and/or 3B) to measure linear travel of the rack 604 within the cylinder 606. In some examples, the rotary position sensor 622 transmits measured values of the rotary travel and/or the linear travel to the HCM 608 via one or more electrical signals along a wired connection. In some such examples, the HCM 608 directs and/or controls the hydraulic fluid to the cylinder 606 based on the measured values.

Figure 7:
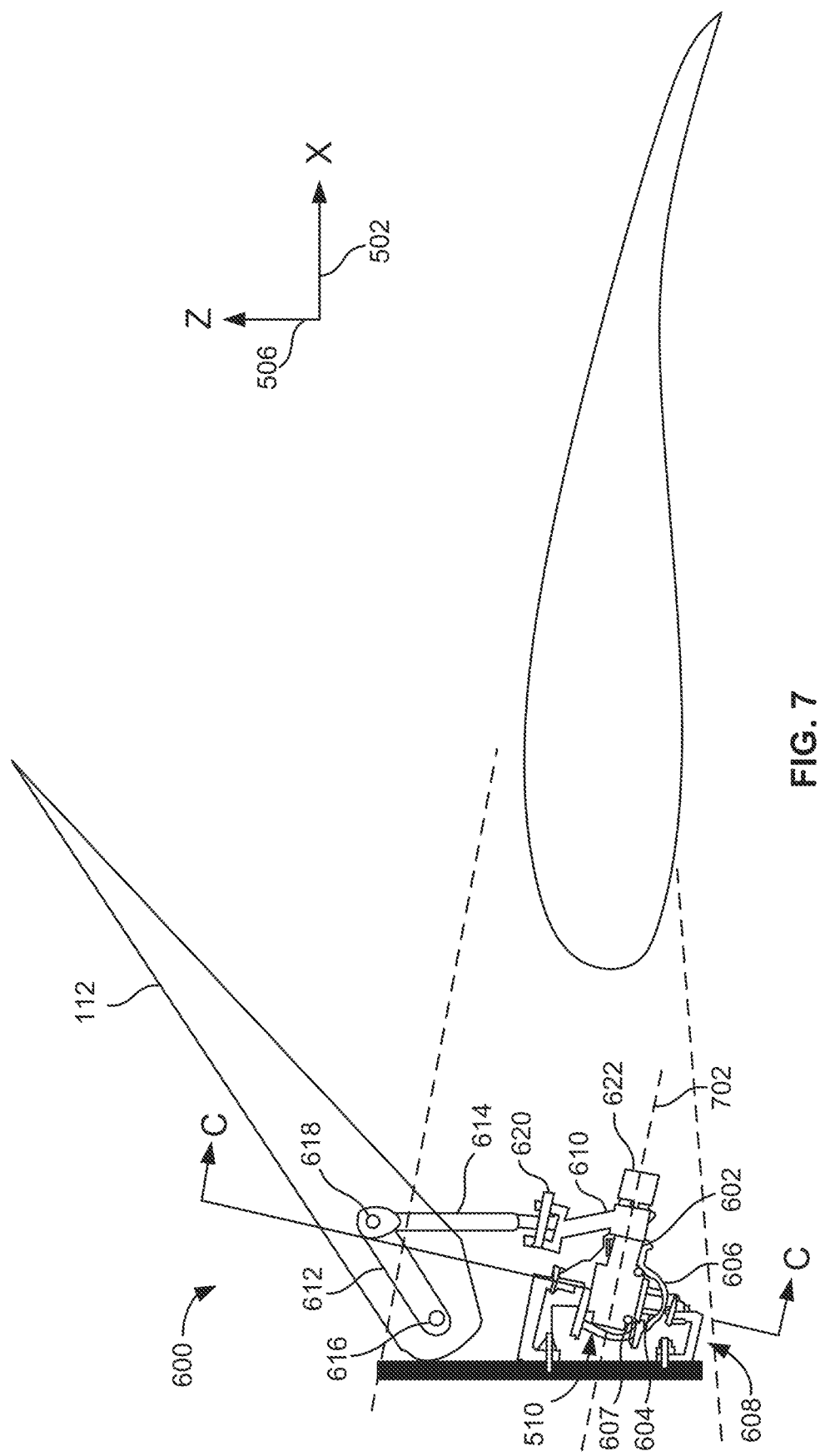
FIG. 7 is an internal view of the example spoiler actuation system of FIG. 6, with the spoiler in an upward position.

FIG. 7 is an internal view of the example spoiler actuation system 600 of FIG. 6, with the spoiler 112 in an upward position. In the illustrated example of FIG. 7, the HCM 608 is configured to direct hydraulic fluid into a first chamber of the cylinder 606 in response to a command signal received at the HCM 608. For example, an operator of the aircraft 100 of FIG. 1 can send the command signal from the cockpit 120 when the aircraft 100 is landing and/or descending.

In the illustrated example of FIG. 7, when the HCM 608 directs hydraulic fluid into a first chamber of the cylinder 606, hydraulic pressure in the first chamber causes the rack 604 to slide from the first position of FIG. 6 to the second position of FIG. 7. As a result of the rack 604 sliding to the second position, the rack 604 causes rotation of the pinion 602 and, thus, corresponding rotation of the first crank 610 about an example pinion axis 702. In such examples, when the first crank 610 rotates in the y-z plane (e.g., where the y-axis 504 is out of the page in FIG. 7), the first crank 610 pushes upward on the rod 614. The rod 614 applies a force in an upward direction on the second joint 618, which causes the second crank 612, and thereby the spoiler 112, to rotate in the x-z plane about the first joint 616 to the upward position.

In some examples, the HCM 608 holds the spoiler 112 in the upward position by maintaining the hydraulic pressure in the first chamber of the cylinder 606 at or above a threshold. Alternatively, the HCM 608 can lower the spoiler 112 by providing hydraulic fluid to a second chamber of the cylinder 606 to raise the hydraulic pressure therein. In such an example, the hydraulic pressure in the second chamber of the cylinder 606 causes the rack 604 to return to the first position, thereby causing the spoiler 112 to return to the cruise position shown in FIG. 6. As such, the HCM 608 controls movement of the spoiler 112 between the upward and cruise positions. In some examples, the HCM 608 causes the spoiler 112 to move to the upward position in response to a first command signal from the cockpit 120, and causes the spoiler 112 to move to the cruise position in response to a second command signal from the cockpit 120.

Additionally or alternatively, the HCM 608 does not provide the hydraulic fluid to the second chamber to lower the spoiler 112 and/or to return the spoiler 112 to the cruise position. For example, during forward propulsion of the aircraft 100, ambient air moving relative to the aircraft 100 applies pressure in a rearward direction on a surface of the spoiler 112 (e.g., where the rearward direction is substantially parallel to the x-axis 502). In some such examples, the air pressure on the spoiler 112 is greater than the upward force applied at the second joint 618, thus causing the spoiler 112 to rotate downward about the first joint 616 to the cruise position. In some examples, the HCM 608 reduces the hydraulic pressure in the first chamber of the cylinder 606 to allow the spoiler 112 to return to the cruise position.

Figure 8A:
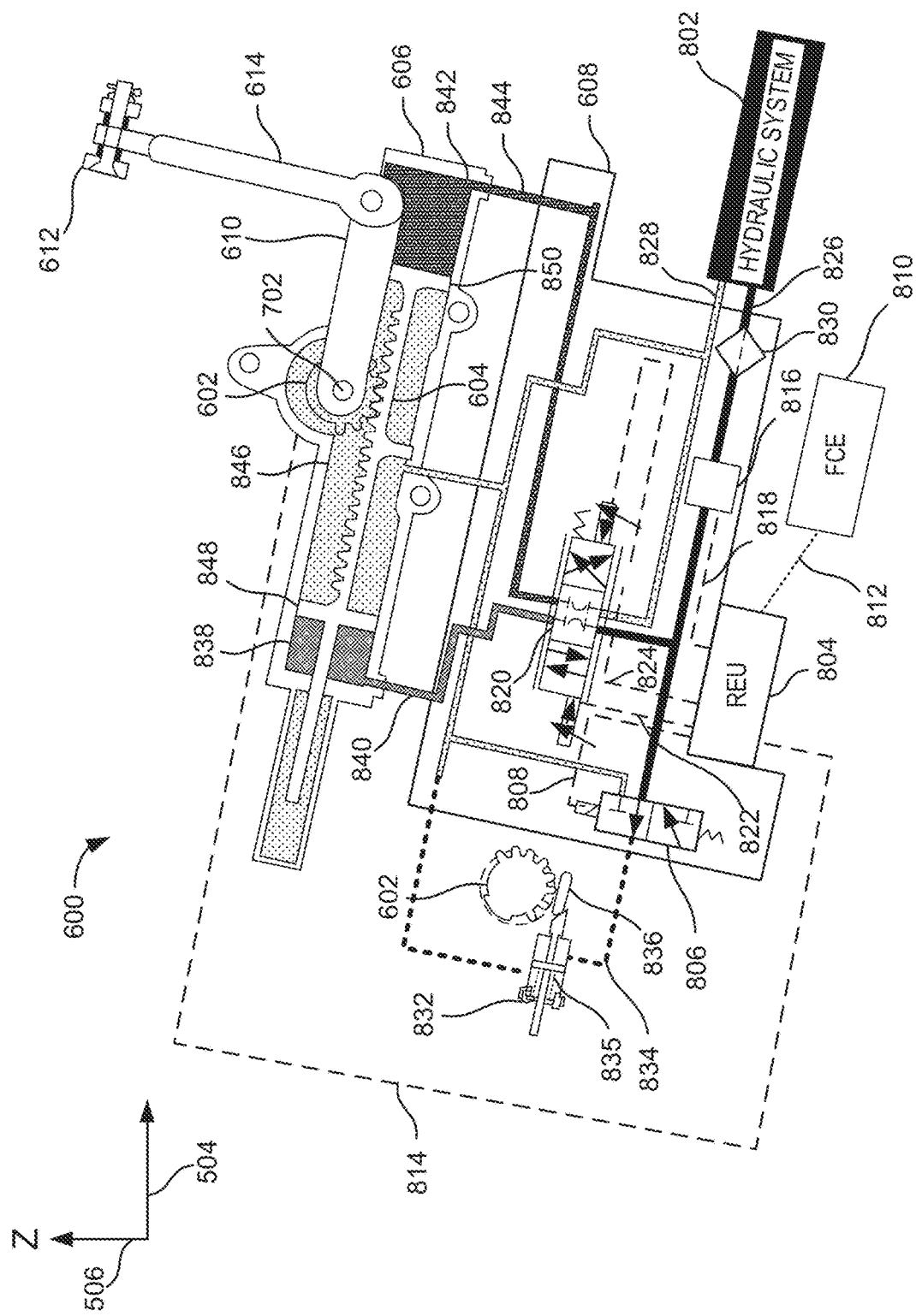
FIG. 8A is a cross-sectional view of the example spoiler actuation system taken along line B-B of FIG. 6.

FIG. 8A is a cross-sectional view of the example spoiler actuation system 600 taken along line B-B of FIG. 6. In the illustrated example of FIG. 8, the HCM 608 is fluidly coupled to an example hydraulic system 802 of the aircraft 100 of FIG. 1. The HCM 608 further includes an example remote electronic unit (REU) 804 communicatively coupled to an example solenoid valve (SOV) 806 via an example first wired connection 808, and communicatively coupled to example flight control electronics (FCE) 810 via an example second wired connection 812. In some examples, the FCE 810 are located in the fuselage 102 of the aircraft 100. The REU 804 is further communicatively and/or operatively coupled to the rotary position sensor 622 of FIGS. 6 and/or 7 via an example third wired connection 814, and communicatively and/or operatively coupled to an example pressure sensor 816 via an example fourth wired connection 818. Furthermore, the REU 804 is electrically and/or operatively coupled to an example electrohydraulic servo-valve (EHSV) 820 via an example fifth wired connection 822 and an example sixth wired connection 824.

In the illustrated example of FIG. 8, the SOV 806 is fluidly coupled to the hydraulic system 802 via example first piping (e.g., tubing, conduit) 826 and example second piping 828. Hydraulic fluid from the hydraulic system 802 flows to the SOV 806 via the first piping 826, and the hydraulic fluid returns to the hydraulic system 802 from the SOV 806 via the second piping 828. In this example, an example inlet filter 830 is implemented within the first piping 826 to filter the hydraulic fluid entering the EHSV 820 and the SOV 806. The inlet filter 830 filters and/or removes contaminants from the hydraulic fluid to reduce damage to components of the HCM 608.

In this example, the REU 804 is configured to send control signals to the SOV 806 based on pressure data received from the pressure sensor 816. For example, the REU 804 receives the pressure data from the pressure sensor 816 via the fourth wired connection 818. In this example, the pressure data corresponds to a hydraulic pressure of the hydraulic fluid in the first piping 826. The REU 804 compares the hydraulic pressure to a first pressure threshold. In response to the hydraulic pressure satisfying the first pressure threshold, the REU 804 sends a first control signal to the SOV 806 to cause the SOV 806 to move to a first state (e.g., as shown in the illustrated example of FIG. 8A). Conversely, in response to the hydraulic pressure not satisfying the first pressure threshold, the REU 804 sends a second control signal to the SOV 806 to cause the SOV 806 to move to a second state. In this example, the SOV 806 switches between the first and second states to selectively enable or prevent flow of hydraulic fluid to an example auxiliary actuator 832.

In the illustrated example of FIG. 8A, the SOV 806 is fluidly coupled to the auxiliary actuator 832 via example piping 834. In this example, when the SOV 806 is in the first state, the SOV 806 enables hydraulic fluid to flow to the auxiliary actuator 832 and cause the auxiliary actuator 832 to move to a retracted position. The auxiliary actuator 832 is operatively coupled to the pinion 602 via an example locking lever 836. When the auxiliary actuator 832 is in the retracted position, the locking lever 836 does not engage the pinion 602. As such, the pinion 602 can freely rotate about the pinion axis 702, thus allowing the spoiler 112 to move between the upward and cruise positions. Conversely, when the SOV 806 is in the second state, the SOV 806 prevents and/or restricts the flow of hydraulic fluid to the auxiliary actuator 832. In this example, when a fluid pressure inside the auxiliary actuator 832 is below a second pressure threshold, the auxiliary actuator 832 is biased to an extended position by an example mechanical spring 835 of the auxiliary actuator 832. When the auxiliary actuator 832 is in the extended position, the auxiliary actuator 832 pushes the locking lever 836 and causes the locking lever 836 to engage with the pinion 602. In such an example, the locking lever 836 prevents and/or restricts clockwise rotation of the pinion 602, thereby preventing and/or restricting movement of the spoiler 112 between the upward and cruise positions. The auxiliary actuator 832 and the locking lever 836 are described further in detail in connection with FIG. 10 below.

In this example, the first piping 826 and the second piping 828 are further fluidly coupled to the EHSV 820. Additionally, the EHSV 820 is fluidly coupled to an example first chamber 838 of the cylinder 606 via example third piping 840, and is fluidly coupled to an example second chamber 842 of the cylinder 606 via example fourth piping 844. The EHSV 820 is fluidly coupled to an example third chamber 846 via the example second piping 828. In the illustrated example of FIG. 8, the REU 804 can cause the EHSV 820 to switch between three states (e.g., a neutral state as shown in FIG. 8A, a third state as shown in FIG. 8B below, and a fourth state as shown in FIG. 9 below) to control flow of hydraulic fluid between the first and second chambers 838, 842, thus controlling movement of the spoiler 112 between the upward and cruise positions.

In this example, the REU 804 receives first and/or second command signals from the FCE 810 via the second wired connection 812. The REU 804 determines that the spoiler 112 is to move upward in response to receiving the first command signal, or the REU 804 determines that the spoiler 112 is to move downward in response to receiving the second command signal. In the illustrated example, in response to determining that the spoiler 112 is to move upward, the REU 804 sends a first control signal to the EHSV 820 via the fifth wired connection 822. The EHSV 820 switches to the third state (e.g., shown in the illustrated example of FIG. 8B below) in response to receiving the first control signal. Conversely, in response to determining that the spoiler 112 is to move downward, the REU 804 sends a second control signal to the EHSV 820 via the sixth wired connection 824. The EHSV 820 switches to the fourth state (e.g., shown in the illustrated example of FIG. 9 below) in response to receiving the second control signal.

In the illustrated example of FIG. 8A, the EHSV 820 is in the neural state. In such an example, the third piping 840 and the fourth piping 844 are not fluidly coupled to the hydraulic system 802 when the EHSV 820 is in the neutral state. As such, the EHSV 820 in the neutral state prevents fluid from flowing to or from the first and second chambers 838, 842, thereby holding the pinion 602, the rack 604, and the spoiler 112 in a current position as shown in FIG. 8A. In some examples, the EHSV 820 is in the neutral state when the current position of the spoiler 112 corresponds to a desired position of the spoiler 112.

Figure 8B:
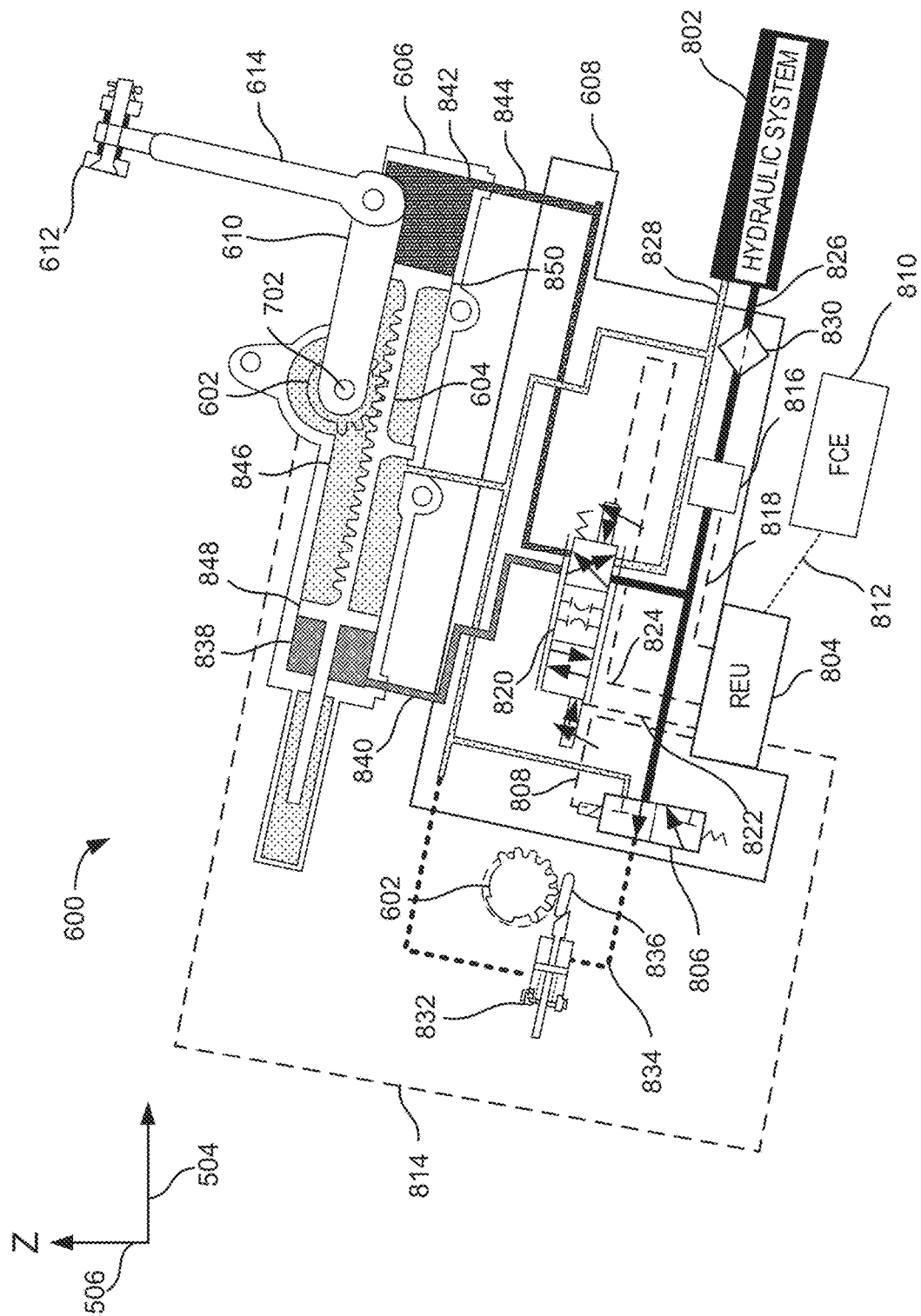
FIG. 8B is a cross-sectional view of the example spoiler actuation system taken along line B-B of FIG. 6 with the spoiler in the cruise position.
Figure 9:
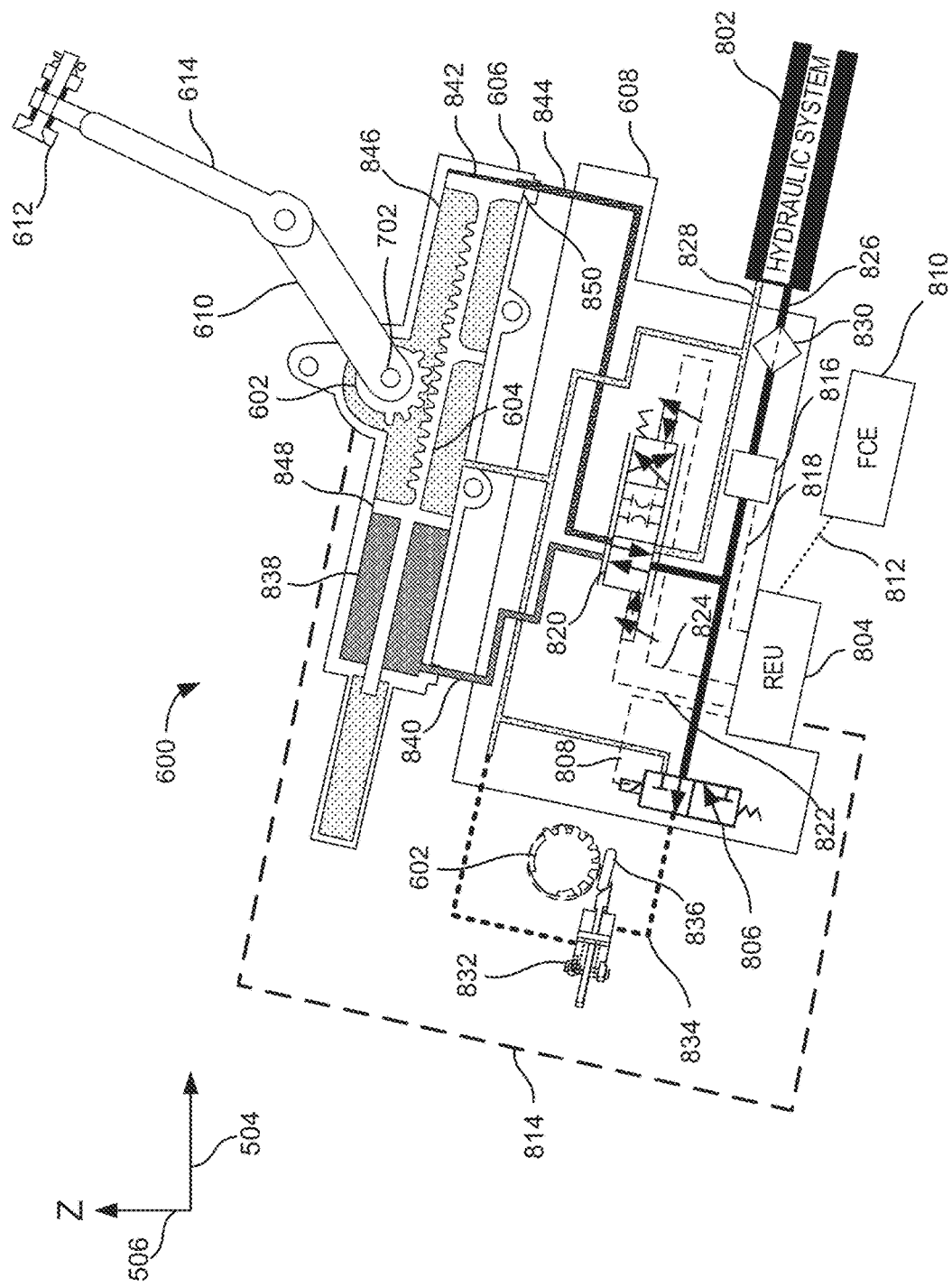
FIG. 9 is a cross-sectional view of the example spoiler actuation system taken along line C-C of FIG. 7.

FIG. 8B is a cross-sectional view of the example spoiler actuation system 600 taken along line B-B of FIG. 6 with the spoiler 112 moving toward the cruise position. In the illustrated example of FIG. 8B, the REU 804 receives the first command signal from the FCE 810 via the second wired connection 812, and the REU 804 determines that the spoiler 112 is to move toward the cruise position in response to receiving the first command signal. In this example, the REU 804 sends a first control signal to the EHSV 820 to cause the EHSV 820 to switch to the third state shown FIG. 8B.

When the EHSV 820 is in the third state, the EHSV 820 fluidly couples the first piping 826 to the fourth piping 844, and fluidly couples the second piping 828 to the third piping 840. In such examples, the EHSV 820 in the third state directs hydraulic fluid from the hydraulic system 802 to the second chamber 842, and enables hydraulic fluid from the first chamber 838 to return to the hydraulic system 802. In this example, hydraulic fluid in the first chamber 838 generates hydraulic pressure on an example first piston 848 coupled to the rack 604, and hydraulic fluid in the second chamber 842 generates hydraulic pressure on an example second piston 850 coupled to the rack 604. In this example, the first and second pistons 848, 850 are coupled to the rack 604 at opposite ends of the rack 604.

In this example, when the EHSV 820 in the third state, the hydraulic pressure increases on the second piston 850. In the illustrated example of FIG. 8B, the rack 604 is moving leftward toward a first position within the cylinder 606. In some examples, the rack 604 moves toward the first position when the hydraulic pressure on the second piston 850 is greater than the hydraulic pressure on the first piston 848. In this example, teeth of the pinion 602 engage with corresponding teeth of the rack 604, such that when the rack 604 translates between the first position and a second position leftward in FIG. 8B, the pinion 602 rotates between third and fourth positions. When the rack 604 is in the first position of FIG. 8B, the pinion 602 is in the third position, and thus the first crank 610, the rod 614, and the second crank 612 hold the spoiler 112 in the cruise position (e.g., as shown in FIG. 6). The rack 604 in FIG. 8B can be controlled to move further leftward to move the spoiler 112 from the cruise position to a droop position.

Turning to FIG. 9, a cross-sectional view of the example spoiler actuation system 600 taken along line C-C of FIG. 7 is shown. In the illustrated example of FIG. 9, the spoiler actuation system 600 is configured to hold the spoiler 112 in the upward position (e.g., as shown in FIG. 7). For example, the spoiler actuation system 600 moves from a first configuration shown in FIG. 8B to a second configuration shown in FIG. 9 to move the spoiler 112 from the cruise position to the upward position. In some examples, an operator of the aircraft 100 of FIG. 1 operates the FCE 810 to send the second command signal to the REU 804 via the second wired connection 812, where the first command signal indicates to the REU 804 that the spoiler 112 is to be deployed (e.g., moved to the upward position). In some examples, the FCE 810 send the second command signal when the aircraft 100 is landing and/or descending. In the illustrated example of FIG. 9, the SOV 806 is in the first state and the auxiliary actuator 832 is in the retracted position, thus allowing the pinion 603 to freely rotate about the pinion axis 702.

In this example, the REU 804 determines an angular position and/or rotary travel of the pinion 602 based on measurement data (e.g., position data) received from the rotary position sensor 622. For example, the rotary position sensor 622 is configured to measure the angular position of the pinion 602, and periodically transmits the measured angular position to the REU 804 via one or more feedback signals. The REU 804 determines the rotary travel based on the angular positions of the pinion 602 over time. In some examples, the rotary position sensor 622 sends the one or more feedback signals to the REU 804 based on a selected frequency. In some examples, the frequency is selected during initialization and/or implementation of the rotary position sensor 622 on the pinion 602. In other examples, the rotary position sensor 622 sends the measurement data to the REU 804 in response to receiving a request from the REU 804 via the third wired connection 814. In such examples, the request is an electrical signal sent from the REU 804 to the rotary position sensor 622.

In the illustrated example of FIG. 9, in response to receiving the second command signal and the measurement data, the REU 804 determines a target position of the pinion 602 based on the second command signal, and determines a current position of the pinion 602 based on the measurement data. When the current position is clockwise relative to the target position, the REU 804 directs the EHSV 820 to switch to the fourth state as shown in FIG. 9. When the EHSV 820 is in the fourth state, the EHSV 820 fluidly couples the first piping 826 to the third piping 840, and fluidly couples the second piping 828 to the fourth piping 844. In such examples, the EHSV 820 in the fourth state directs hydraulic fluid from the hydraulic system 802 to the first chamber 838, and enables hydraulic fluid from the second chamber 842 to return to the hydraulic system 802. In such examples, the hydraulic fluid in the first chamber 838 increases the hydraulic pressure on the first piston 848 and moves the rack 604 rightward in FIG. 9, thereby causing counterclockwise rotary travel of the pinion 602. Alternatively, when the current position is counterclockwise relative to the target position, the REU 804 directs the EHSV 820 to switch to the third state of FIG. 8B to provide hydraulic fluid to the second chamber 842. In such examples, the hydraulic fluid in the second chamber 842 causes the rack 604 to move leftward in FIG. 9, thereby causing clockwise rotary travel of the pinion 602.

In the illustrated example of FIG. 9, the target position of the pinion 602 corresponds to the spoiler 112 being in the upward position. As such, to move the spoiler 112 upward, the pinion 602 is to rotate counterclockwise from the current position toward the target position. Accordingly, the REU 804 sends the second control signal to the EHSV 820 to cause the EHSV 820 to switch to the fourth state. When the EHSV 820 is in the fourth state, hydraulic fluid flows into the first chamber 838 and generates hydraulic pressure on the first piston 848 in a rightward direction in FIG. 9. When the hydraulic pressure on the first piston 848 is greater than the hydraulic pressure on the second piston 850, the rack 604 moves in the rightward direction. When the rack 604 moves in the rightward direction, the second piston 850 expels the hydraulic fluid from the second chamber 842 to the hydraulic system 802 via the fourth piping 844.

The pinion 602 is operatively coupled to the rack 604 such that, when the rack 604 moves in the rightward direction, the pinion 602 rotates counterclockwise in the illustrated example of FIG. 9. The first crank 610 rotates with the pinion 602, such that rotary travel of the first crank 610 about the pinion axis 702 corresponds to rotary travel of pinion 602. When the first crank 610 rotates counterclockwise about the pinion axis 702, the first crank 610 pushes the rod 614 upward. Accordingly, an upward force of the rod 614 on the second joint 618 causes the second crank 612, and thereby the spoiler 112, to rotate upward about the first joint 616 of FIGS. 6 and/or 7.

In some examples, the REU 804 calculates an error between the current position and the target position. In some examples, the REU 804 selectively controls a current value of the control signals to the EHSV 820 based on the error. In such examples, the EHSV 820 provides the hydraulic fluid to the first and second chambers 838, 842 at a pressure and/or flow rate corresponding to the current value. For example, the EHSV 820 increases the pressure and/or flow rate of the hydraulic fluid to the first chamber 838 in response to an increase in a first current value of the first control signal, and the EHSV 820 reduces the pressure and/or flow rate of the hydraulic fluid to the first chamber 838 in response to a reduction in the first current value. Similarly, the EHSV 820 increases the pressure and/or flow rate of the hydraulic fluid to the second chamber 842 in response to an increase in a second current value of the second control signal, and the EHSV 820 reduces the pressure and/or flow rate of the hydraulic fluid to the second chamber 842 in response to a reduction in the second current value. In some examples, a speed of linear travel of the rack 604 corresponds to the pressure and/or flow rate of the hydraulic fluid into the first and second chambers 838, 842. As such, by selectively varying the first and second current values, the REU 804 can precisely control the speed at which the pinion 602 moves from the current position to the target position. Thus, spoiler actuation system 600 enables smooth travel of the spoiler 112 between the cruise position and the upward position (e.g., without significant delay or overshoot).

In some examples, the spoiler actuation system 600 can return the spoiler 112 to the cruise position. For example, the operator of the aircraft 100 can operate the FCE 810 to send the first command signal to the REU 804 via the second wired connection 812, where the first command signal indicates to the REU 804 that the spoiler 112 is to be retracted (e.g., moved to the cruise position). In some examples, the FCE 810 send the first command signal when the aircraft 100 is ascending and/or in cruise. In such examples, the REU 804 directs the EHSV 820 to switch to the third state, thus moving the spoiler 112 downward as described in connection with FIG. 8B above.

In some examples, in response to the REU 804 determining that the pinion 602 is in the target position (e.g., thereby indicating that the spoiler 112 is in a desired position), the REU 804 directs the EHSV 820 to switch to the neutral state as shown in FIG. 8A. When the EHSV 820 is in the neutral state, the EHSV 820 prevents flow of hydraulic fluid into both the first and second chambers 838, 842. In such examples, the hydraulic pressure in the first and second chambers 838, 842 allows the spoiler 112 to remain in the desired position until a new command signal is received by the REU 804.

FIG. 10A is a detailed view of the example auxiliary actuator 832 and the example locking lever 836 of FIGS. 8 and/or 9. In the illustrated example of FIG. 10A, the auxiliary actuator 832 includes an example piston 1002 coupled to an example rod 1004. The piston 1002 and the rod 1004 are slidable within an example actuator cylinder 1006. The actuator cylinder 1006 includes example first and second chambers 1008, 1010. In some examples, the first chamber 1008 is fluidly coupled to the SOV 806 of FIGS. 8 and/or 9 via the piping 834, and the second chamber 1010 is fluidly coupled to the return line (e.g., the second piping 828) of hydraulic system 802 of FIGS. 8 and/or 9. In this example, the piston 1002 is sealably engaged with the actuator cylinder 1006 to prevent flow of hydraulic fluid between the first and second chambers 1008, 1010. In this example, an example follower 1012 is coupled to an end of the rod 1004 to engage with the locking lever 836. The mechanical spring 835 is compressed by the hydraulic pressure in the first chamber 1008 in the illustrated example of FIG. 10A. In this example, the mechanical spring 835 is operatively coupled between the piston 1002 and an example end plate 1014 of the actuator cylinder 1006.

In the illustrated example of FIG. 10A, when the SOV 806 is in the first state, the SOV 806 directs hydraulic fluid from the hydraulic system 802 to the first chamber 1008 of the auxiliary actuator 832. The hydraulic fluid in the first chamber 1008 generates hydraulic pressure on the piston 1002 in a leftward direction in FIG. 10A. When the hydraulic pressure on the piston 1002 is greater than a force of the mechanical spring 835 on the piston 1002, the hydraulic pressure causes the piston 1002 and the rod 1004 to move leftward and compress the mechanical spring 835. In such an example, the auxiliary actuator 832 is in a retracted position, and the follower 1012 is stopped by the actuator cylinder 1006.

Conversely, when the SOV 806 is in the second state to prevent hydraulic fluid from flowing to the first chamber 1008, the hydraulic pressure in the first chamber 1008 is routed to the return line of the hydraulic system 802. Accordingly, the hydraulic pressure in the first chamber 1008 is less than the force of the mechanical spring 835 on the piston 1002, and the mechanical spring 835 is extended to cause the piston 1002 and the rod 1004 to move rightward in the illustrated example of FIG. 10A. In such examples, the auxiliary actuator 832 is in an extended position, and the follower 1012 is positioned away from the actuator cylinder 1006.

In the illustrated example, an example torsion spring 1016 is operatively coupled an example pivot bolt 1018 through the example locking lever 836. The pivot bolt 1018 is implemented within an example lever bracket 1020, and the locking lever 836 is rotatable about the pivot bolt 1018. In this example, the torsion spring 1016 causes the locking lever 836 to rotate counterclockwise and rest on the follower 1012 as shown in FIG. 10A. For example, when the locking lever 836 rotates away (e.g., in a clockwise direction) from the follower 1012, the torsion spring 1016 increases a force on the locking lever 836. The torsion spring 1016 is further coupled to an example bolt 1022 through the locking lever 836.

Turning to FIG. 10B, a cross-sectional view of the example locking lever 836 of FIG. 10A taken along line D-D of FIG. 10A is shown. In the illustrated example of FIG. 10B, the locking lever 836 and the torsion spring 1016 are coupled to the pivot bolt 1018 between first and second walls 1102, 1104 of the lever bracket 1020. In this example, example bearings 1106 are coupled between the locking lever 836 and the pivot bolt 1018, and example bushings 1108 are coupled between the pivot bolt 1018 and the first and second walls 1102, 1104.

FIG. 10C illustrates the example locking lever 836 of FIG. 10B including an example safety pin 1110. For example, the safety pin 1110 is coupled between the first and second walls 1102, 1104 and the locking lever 836. In some examples, the safety pin 1110 is used to hold the locking lever 836 in a desired position and/or prevent rotation of the locking lever 836 about the pivot bolt 1018.

Returning to FIG. 10A, the auxiliary actuator 832 and the locking lever 836 are positioned proximate the pinion 602 of FIGS. 8 and/or 9. When the hydraulic system 802 is operating above a pressure threshold (e.g., during normal operating conditions), the auxiliary actuator 832 is in the retracted position, and the torsional spring 1016 causes the locking lever 836 to rest on a surface of the follower 1012. In such examples, the locking lever 836 does not interfere with the pinion 602, thus enabling the pinion 602 to rotate freely. Conversely, when the hydraulic system 802 is operating below the pressure threshold (e.g., during abnormal operating conditions), the auxiliary actuator 832 is in the extended position, the follower 1012 pushes the locking lever 836 and causes the locking lever 836 to rotate clockwise about the pivot bolt 1018 (e.g., rotate upward in the illustrated example of FIG. 10A). When the locking lever 836 rotates upward, the locking lever 836 engages a notch of the pinion 602 to prevent and/or restrict rotation of the pinion 602, thus preventing movement of the spoiler 112.

Figure 11:
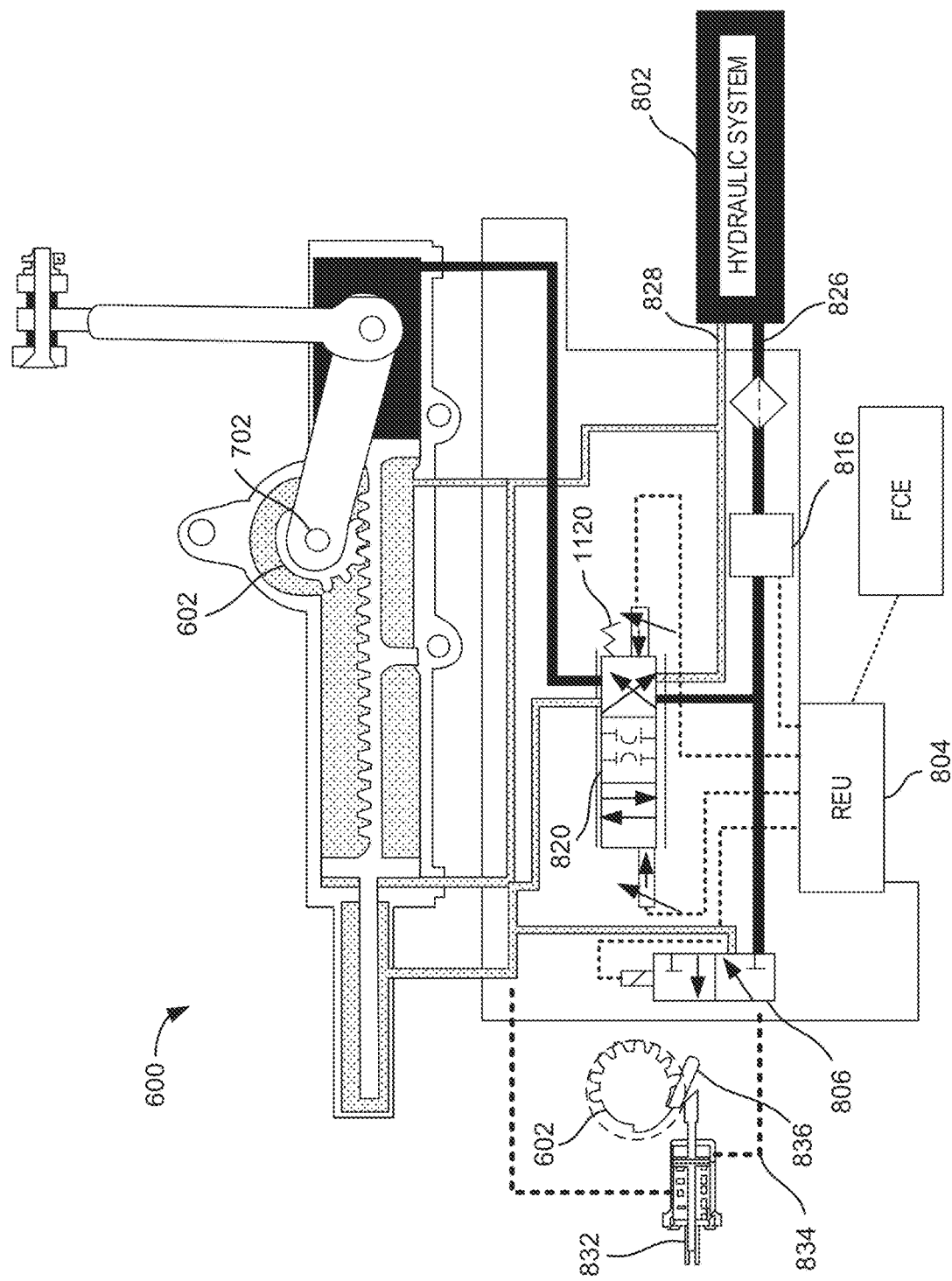
FIG. 11 is a cutaway view of the example spoiler actuation system of FIGS. 8A, 8B, and/or 9 during abnormal hydraulic operating conditions of the hydraulic system.

FIG. 11 is a cutaway view of the example spoiler actuation system 600 of FIGS. 8 and/or 9 during abnormal hydraulic operating conditions of the hydraulic system 802. For example, during abnormal operating conditions, the hydraulic system 802 is depressurized and/or operating below a pressure threshold. In such examples, the REU 804 receives pressure data from the pressure sensor 816, and determines, based on the pressure data, that the hydraulic system 802 is operating below the pressure threshold.

In response determining that the hydraulic system 802 is operating below the pressure threshold, the REU 804 causes the SOV 806 to switch to the second state and de-activates electrical command to the EHSV 820. In such an example, an example bias spring 1120 of the EHSV 820 causes the EHSV 820 to switch to the third state, as shown in the illustrated example of FIG. 11. When the SOV 806 is in the second state, the SOV 806 prevents hydraulic fluid from the first piping 826 from flowing to the auxiliary actuator 832. Furthermore, the SOV 806 in the second state fluidly couples the piping 834 to the return line (e.g., the second piping 828) of the hydraulic system 802.

In the illustrated example of FIG. 11, as a result of the SOV 806 preventing the flow of hydraulic fluid to the first chamber 1008 of the auxiliary actuator 832 shown in FIG. 10A, the auxiliary actuator 832 moves to the extended position. In such examples, hydraulic fluid in the first chamber 1008 is expelled therefrom and returns to the hydraulic system 802 via the second piping 828. When the auxiliary actuator 832 is in the extended position, the auxiliary actuator 832 pushes the locking lever 836 upward in the illustrated example and causes the locking lever 836 to engage with the notch of the pinion 602. In such examples, the locking lever 836 prevents counterclockwise rotation of the pinion 602 about the pinion axis 702, thereby preventing upward motion of the spoiler 112 during abnormal operating conditions of the hydraulic system 802 and/or an electrical failure.

Figure 12:
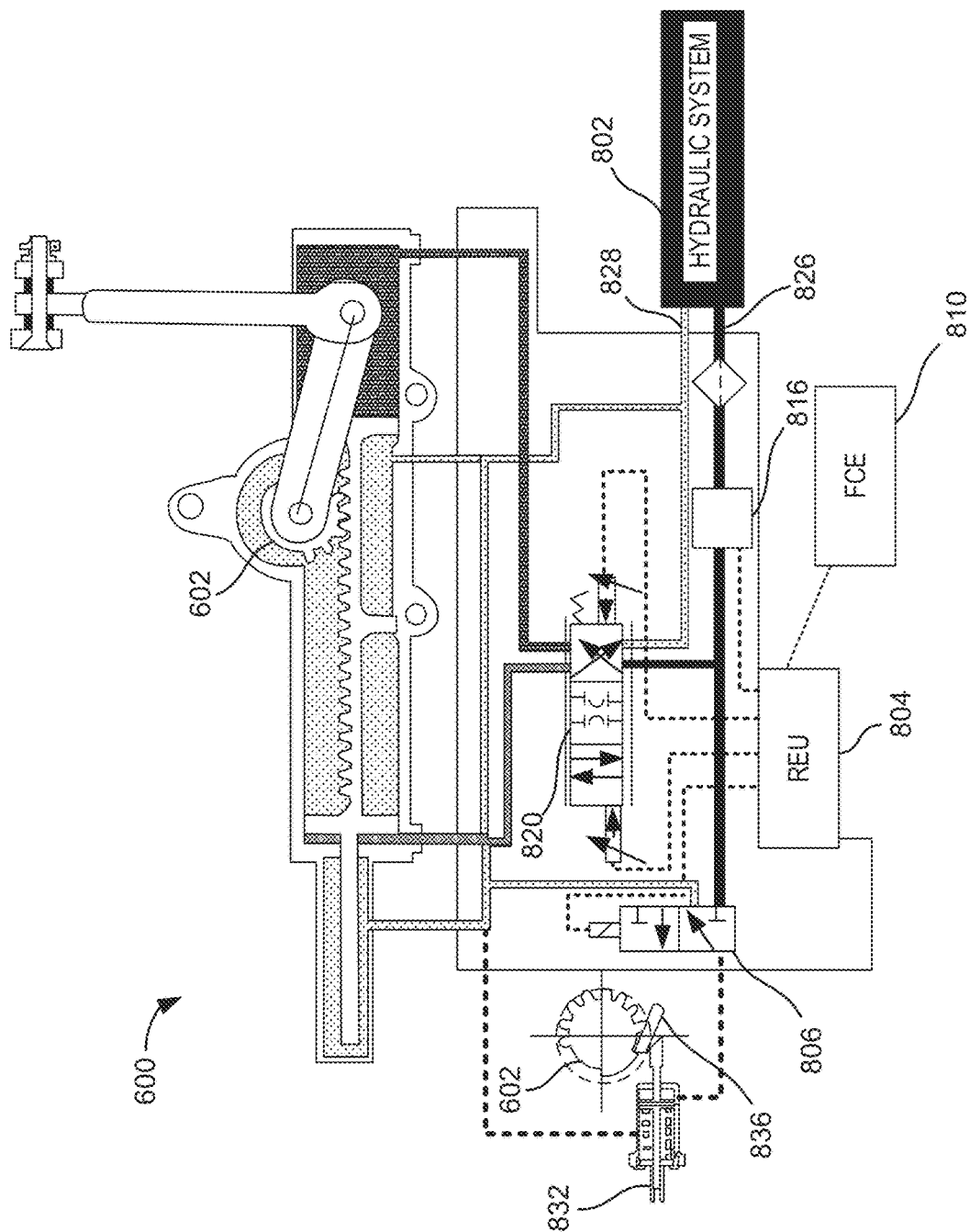
FIG. 12 is a cutaway view of the example spoiler actuation system of FIGS. 8A, 8B, 9, and/or 11 when maintenance is to be performed on and/or near the example spoiler.

FIG. 12 is a cutaway view of the example spoiler actuation system 600 of FIGS. 8, 9, and/or 11 when a maintenance task is to be performed on and/or near the spoiler 112 of FIGS. 6 and/or 7 and the hydraulic system 802 is to remain pressurized. To shut off the spoiler actuation system 600 and/or prevent upward travel of the spoiler 112, an operator of the aircraft 100 can send a command signal to the REU 804 via the FCE 810. In response to receiving the command signal, the REU 804 causes the SOV 806 to switch to the second state and de-activates electrical command to the EHSV 820, thereby causing the EHSV 820 to switch to the third state. As described above in connection with FIG. 11, when the SOV 806 and the EHSV 820 are in the second and third states, respectively, the auxiliary actuator 832 moves to the extended position and causes the locking lever 836 to rotate upward and engage with a notch of the pinion 602. Additionally, the operator can manually insert the safety pin 1110 of FIG. 10C into the locking lever 836. In such examples, when the locking lever 836 rotates upward and engages with a notch of the pinion 602, the safety pin 1110 locks the locking lever 836 in a current position. The safety pin 1110 locks the locking lever 836 to prevent rotation of the pinion 602, thereby preventing upward travel of the spoiler 112. In some examples, the safety pin 1110 is removed from the locking lever 836 after the maintenance task is completed. Advantageously, by preventing upward travel of the spoiler 112, the safety pin 1110 allows ground crew to safely perform maintenance on or near the spoiler 112 and/or allows the aircraft 100 to dispatch with one inoperative spoiler.

FIG. 13 is an example table 1300 representing positions of the spoiler 112 and the auxiliary actuator 832 for corresponding states of the aircraft 100 of FIG. 1 and the hydraulic system 802 of FIGS. 8A, 8B, 9, 11, and/or 12. In the illustrated example of FIG. 13, the table 1300 includes an example first column 1301 corresponding to the states of the aircraft 100, an example second column 1302 corresponding to the states of the hydraulic system 802, an example third column 1304 corresponding to the positions of the auxiliary actuator 832, and an example fourth column 1306 corresponding to the positions of the spoiler 112.

In the illustrated example of FIG. 13, an example first row 1308 corresponds to the aircraft 100 being in flight and the hydraulic system 802 being turned on and operating under normal hydraulic operating conditions. In such examples, hydraulic fluid from the hydraulic system 802 is provided to the HCM 608 at or above a pressure threshold. Accordingly, as indicated in the first row 1308, the auxiliary actuator 832 is in the retracted position when the hydraulic system 802 is operating at or above the pressure threshold. In such examples, the position of the spoiler 112 is controllable via the command signals from the FCE 810 and/or the control signals from the REU 804. For example, the spoiler 112 travels upward in response to the REU 804 causing the EHSV 820 to switch to the fourth state shown in FIG. 9, and the spoiler 112 travels downward in response to the REU 804 causing the EHSV 820 to switch to the third state shown in FIG. 8B. In some examples, the REU 804 causes the EHSV 820 to switch to the neutral state shown in FIG. 8A to hold the spoiler 112 in a desired position, where the EHSV 820 in the neutral state prevents the flow of fluid into both the first and second chambers 838, 842 of the cylinder 606. In some examples, the desired position is between the upward position and the cruise position. In some such examples, the REU 804 determines the desired position based on the command signals received from the FCE 810.

In the illustrated example of FIG. 13, an example second row 1310 corresponds to the aircraft 100 being in flight and the hydraulic system 802 being turned on and operating below the pressure threshold. In such examples, hydraulic fluid from the hydraulic system 802 is provided to the HCM 608 below the pressure threshold. Accordingly, as indicated in the second row 1310, the auxiliary actuator 832 is in the extended position when the hydraulic system 802 is operating below the pressure threshold. In such examples, the auxiliary actuator 832 causes the locking lever 836 to rotate upward and engage the pinion 602, thus preventing upward travel of the spoiler 112. Additionally, when the spoiler 112 is in the upward position and the hydraulic system 802 is operating below the pressure threshold, an aerodynamic force on the spoiler 112 can move the spoiler 112 downward to the cruise position.

In the illustrated example of FIG. 13, an example third row 1312 corresponds to the aircraft 100 being in flight and the hydraulic system 802 being turned off and/or failing. Accordingly, as indicated in the third row 1312, the auxiliary actuator 832 is in the extended position when the hydraulic system 802 fails. In such examples, the auxiliary actuator 832 causes the locking lever 836 to rotate upward and engage the pinion 602, thus preventing upward travel of the spoiler 112. In such examples, the locking lever 836 prevents an upward aerodynamic force on the spoiler 112 from moving the spoiler 112 upward.

In the illustrated example of FIG. 13, an example fourth row 1314 corresponds to the aircraft 100 being on the ground and the hydraulic system 802 being turned on and operating under normal hydraulic operating conditions. Accordingly, as indicated in the third row 1312, the auxiliary actuator 832 is in the extended position. In this example, the REU 804 de-activates the SOV 806 and the EHSV 820 via electrical command. In such examples, maintenance personnel insert a handle into the locking lever 836 to lock the pinion 602 and the spoiler 112 in the cruise position. When the pinion 602 and the spoiler 112 are locked, the maintenance personnel can perform a maintenance task on and/or near the spoiler 112.

Figure 14:
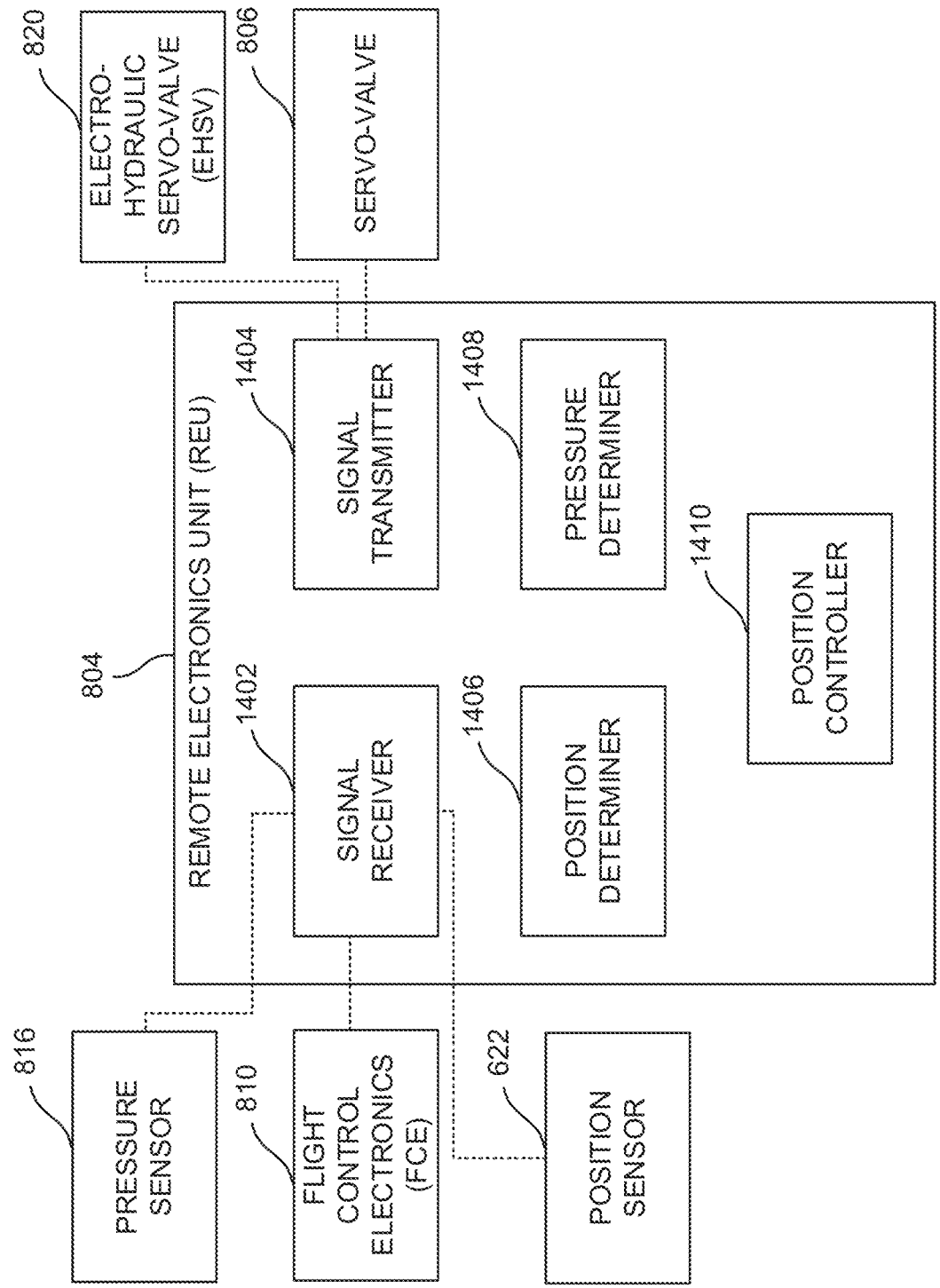
FIG. 14 is a block diagram of an example remote electronics unit (REU) implemented by the spoiler actuation system of FIGS. 8A, 8B, 9, 11, and/or 12.

FIG. 14 is a block diagram of the example REU 804 implemented in the spoiler actuation system 600 of FIGS. 8A, 8B, 9, 11, and/or 12. In the illustrated example of FIG. 14, the REU 804 includes an example signal receiver 1402 communicatively and/or electrically coupled to the FCE 810, to the pressure sensor 816, and to the rotary position sensor 622, an example signal transmitter 1404 communicatively and/or electrically coupled to the SOV 806 and to the EHSV 820, an example position determiner 1406, an example pressure determiner 1408, and an example position controller 1410.

The signal receiver 1402 receives signals from the FCE 810, the pressure sensor 816, and/or the rotary position sensor 622. For example, the signal receiver 1402 receives a first command signal and/or a second command signal from the FCE 810. In some examples, the first command signal indicates to the REU 804 that the spoiler 112 is to be moved to the cruise position, and the second command signal indicates to the REU 804 that the spoiler 112 is to be moved to the upward position. In some examples, a current and/or voltage of the first and second command signals indicates the desired position of the spoiler 112, where the desired position is between the upward position and the cruise position. Additionally, the signal receiver 1402 receives position data from the rotary position sensor 622, and/or receives pressure data from the pressure sensor 816. In some examples, the position data corresponds to a current position (e.g., angular position) of the pinion 602, and the pressure data corresponds to a hydraulic pressure of the hydraulic fluid through the first piping 826. In some examples, the signal receiver 1402 receives the position data and/or the pressure data periodically from the rotary position sensor 622 and the pressure sensor 816, respectively.

The signal transmitter 1404 transmits control signals to the SOV 806 and/or to the EHSV 820. In some examples, the signal transmitter 1404 controls a state of the SOV 806 and/or the EHSV 820 based on the control signals. For example, the signal transmitter 1404 sends a first control signal to switch the SOV 806 to a first state, and sends a second control signal to switch the SOV 806 to a second state. In some examples, the signal transmitter 1404 sends third, fourth, and fifth control signals to switch the EHSV 820 to a third, fourth, and neutral state, respectively.

In some examples, the signal transmitter 1404 is communicatively and/or electrically coupled to the FCE 810, to the pressure sensor 816, and/or to the rotary position sensor 622. In some such examples, the signal transmitter 1404 can send the position data and/or the pressure data from the rotary position sensor 622 and/or the pressure sensor 816, respectively, to the FCE 810. Additionally, in some examples, the signal transmitter 1404 can send requests to the rotary position sensor 622 and/or to the pressure sensor 816, where the request is an electrical signal. In some such examples, the rotary position sensor 622 and/or the pressure sensor 816 sends the position data and/or the pressure data to the signal receiver 1402 in response to receiving the request.

The position determiner 1406 determines a position (e.g., angular position) of the pinion 602 based on the position data from the rotary position sensor 622. In some examples, additionally or alternatively, the position determiner 1406 determines a linear position of the rack 604 based on the position data. In some examples, based on the determined position of the pinion 602 and/or the rack 604, the position determiner 1406 determines whether the spoiler 112 is in the cruise position, the upward position, or in a position therebetween.

The pressure determiner 1408 determines a pressure (e.g., hydraulic pressure) of the hydraulic fluid through the first piping 826 based on the pressure data from the pressure sensor 816. In some examples, the pressure determiner 1408 determines whether the pressure of the hydraulic fluid satisfies a pressure threshold.

The position controller 1410 selects the control signals to be transmitted to the SOV 806 and the EHSV 820. In this example, the position controller 1410 determines a target position of the pinion 602 based on the command signal from the FCE 810. Further, the position controller 1410 determines a current position of the pinion 602 based on the position data from the rotary position sensor 622 and calculates an error between the target position and the current position. In some examples, the position controller 1410 selects control signals based on the calculated error. In particular, to reduce the error when the target position is counterclockwise relative to the current position, the position controller 1410 can direct the signal transmitter 1404 to send the first control signal to the SOV 806 and send the fourth control to the EHSV 820. Alternatively, to reduce the error when the target position is clockwise relative to the current position, the position controller 1410 can direct the signal transmitter 1404 to send the first control signal to the SOV 806 and send the third control signal to the EHSV 820. In some examples, the position controller 1410 implements a proportional control loop, a proportional-integral (PI) control loop, and/or a proportional-integral-derivative (PID) control loop to select the control signals.

Figure 15:
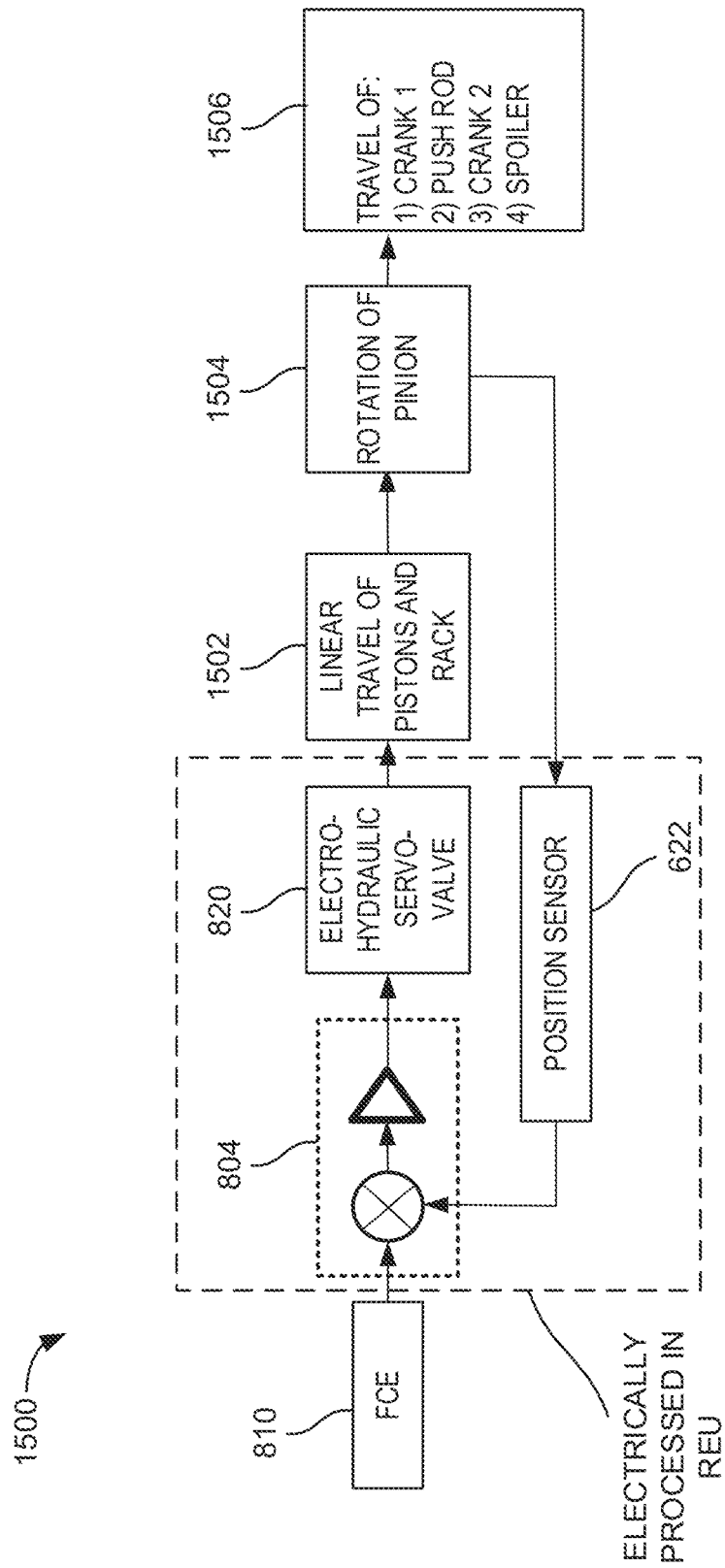
FIG. 15 is a block diagram of an example feedback control loop implemented by the spoiler actuation system of FIGS. 8A, 8B, 9, 11, and/or 12.

FIG. 15 is a block diagram of an example feedback control loop 1500 implemented by the spoiler actuation system 600 of FIGS. 8A, 8B, 9, 11, and/or 12. In some examples, the spoiler actuation system 600 moves the spoiler 112 to a desired position using the feedback control loop 1500. In the illustrated example of FIG. 15, the REU 804 receives a command signal from the FCE 810. In some examples, the REU 804 determines the desired position of the spoiler 112 based on the command signal, where the desired position is the cruise position, the upward position, or a position therebetween. In some examples, the REU 804 determines a target position of the pinion 602 based on the desired position of the spoiler 112.

In this example, the REU 804 additionally receives position data from the rotary position sensor 622. The REU 804 determines a current position of the pinion 602 based on the position data and calculates an error between the current position and the target position of the pinion 602. In some examples, the REU 804 selects the third, fourth, and fifth control signals based on the calculated error. For example, the REU 804 selects the fourth control signal when the pinion 602 is to rotate counterclockwise from the current position to the target position, and the REU 804 selects the third control signal when the pinion 602 is to rotate clockwise from the current position to the target position. In some examples, the REU 804 selects the fifth control signal when the current position of the pinion 602 is substantially the same as the target position. The REU 804 transmits the control signals to the EHSV 820.

The EHSV 820 provides hydraulic fluid to the cylinder 606 based on the control signals. For example, the EHSV 820 provides hydraulic fluid to the first chamber 838 of the cylinder 606 in response to receiving the fourth control signal, and provides hydraulic fluid to the second chamber 842 in response to receiving the third control signal. As such, the EHSV 820 can control the hydraulic pressure on the first and second pistons 848, 850.

As a result of the EHSV 820 providing hydraulic fluid to the cylinder 606, the hydraulic pressure causes linear travel 1502 of the first and second pistons 848, 850 and the rack 604. Furthermore, the linear travel 1502 causes corresponding rotation 1504 of the pinion 602. In this example, the rotation 1504 of the pinion 602 is provided as feedback to the REU 804 via the rotary position sensor 622. The rotation 1504 of the pinion 602 causes corresponding travel 1506 of the first crank 610, the rod 614, the second crank 612, and, thus, the spoiler 112. In this example, the rotary position sensor 622 continuously measures the current position of the pinion 602, and transmits the current position to the REU 804 to enable the REU 804 to recalculate the error between the current and target positions of the pinion 602.

In some examples, the REU 804 determines whether the calculated error satisfies an error threshold. In some examples, the error threshold is less than 2 degrees between the target position and the current position, less than 1 degree between the target position and the current position, etc. In response to the error not satisfying an error threshold, the REU 804 further adjusts the control signals provided to the EHSV 820 to cause the pinion 602 to move toward the target position. In response to the error satisfying the error threshold, the REU 804 determines that the spoiler 112 is at the desired position corresponding to the command signal from the FCE 810. In such an example, the REU 804 sends the fifth control signal to the EHSV 820 to prevent further flow of hydraulic fluid into the cylinder 606, thereby causing the spoiler 112 to remain in the desired position. In some examples, the REU 804 receives another command signal from the FCE 810 corresponding to a new desired position of the spoiler 112. In such examples, the REU 804 repeats the above process until the spoiler 112 has reached the new desired position.

While an example manner of implementing the REU 804 of FIGS. 8A, 8B, 9, 11, and/or 12 is illustrated in FIG. 14, one or more of the elements, processes and/or devices illustrated in FIG. 14 may be combined, divided, re-arranged, omitted, eliminated and/or implemented in any other way. Further, the example signal receiver 1402, the example signal transmitter 1404, the example position determiner 1406, the example pressure determiner 1408, the example position controller 1410, and/or, more generally, the example REU 804 of FIG. 14 may be implemented by hardware, software, firmware and/or any combination of hardware, software and/or firmware. Thus, for example, any of the example signal receiver 1402, the example signal transmitter 1404, the example position determiner 1406, the example pressure determiner 1408, the example position controller 1410, and/or, more generally, the example REU 804 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example signal receiver 1402, the example signal transmitter 1404, the example position determiner 1406, the example pressure determiner 1408, and/or the example position controller 1410 is/are hereby expressly defined to include a non-transitory computer readable storage device or storage disk such as a memory, a digital versatile disk (DVD), a compact disk (CD), a Blu-ray disk, etc. including the software and/or firmware. Further still, the example REU 804 of FIGS. 8A, 8B, 9, 11, and/or 12 may include one or more elements, processes and/or devices in addition to, or instead of, those illustrated in FIG. 14, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 16:
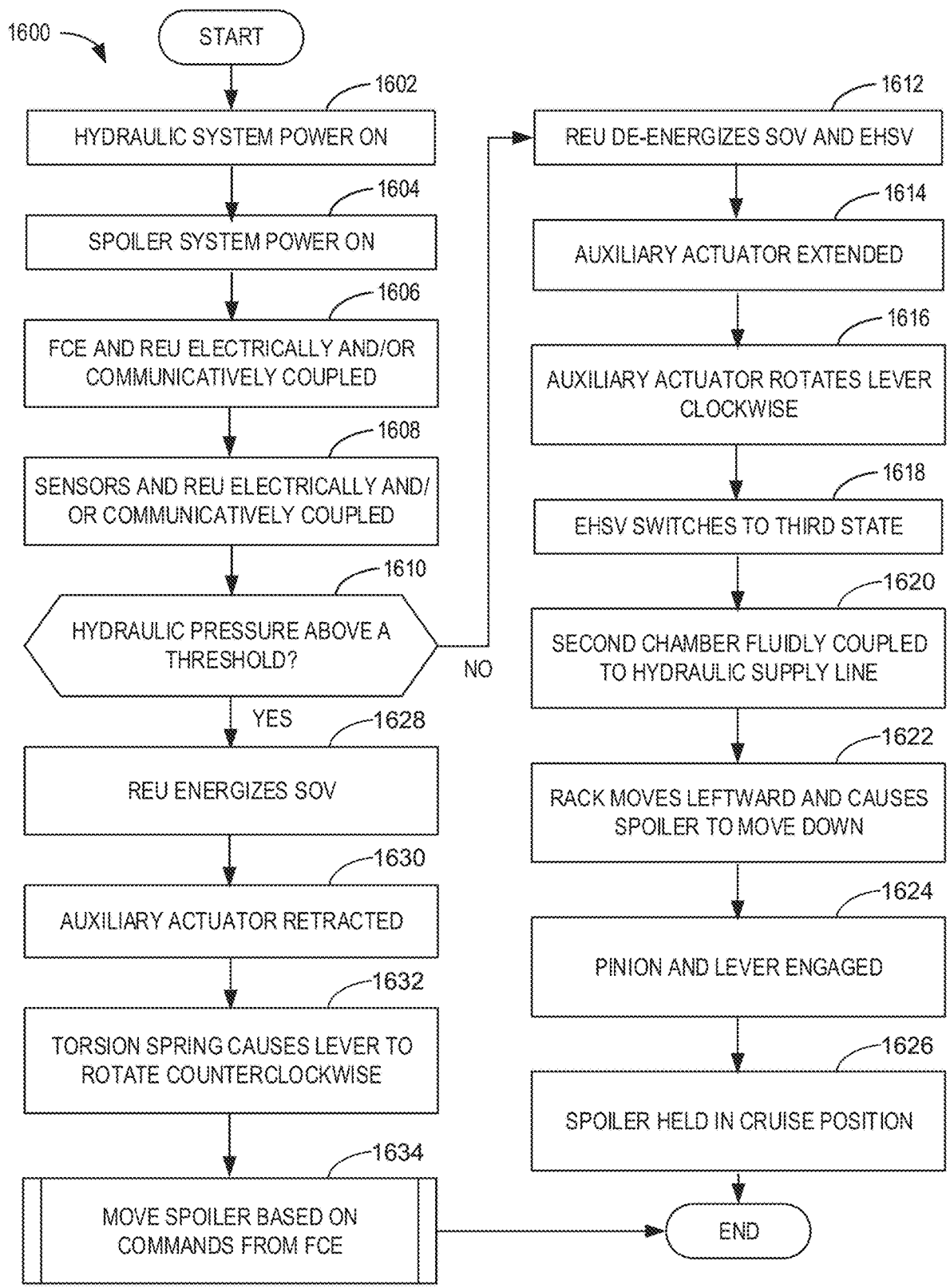
FIG. 16 is a flowchart representative of an example process which may be executed by the spoiler actuation system of FIGS. 8A, 8B, 9, 11, and/or 12 to move the spoiler between the cruise position and the upward position.
Figure 17:
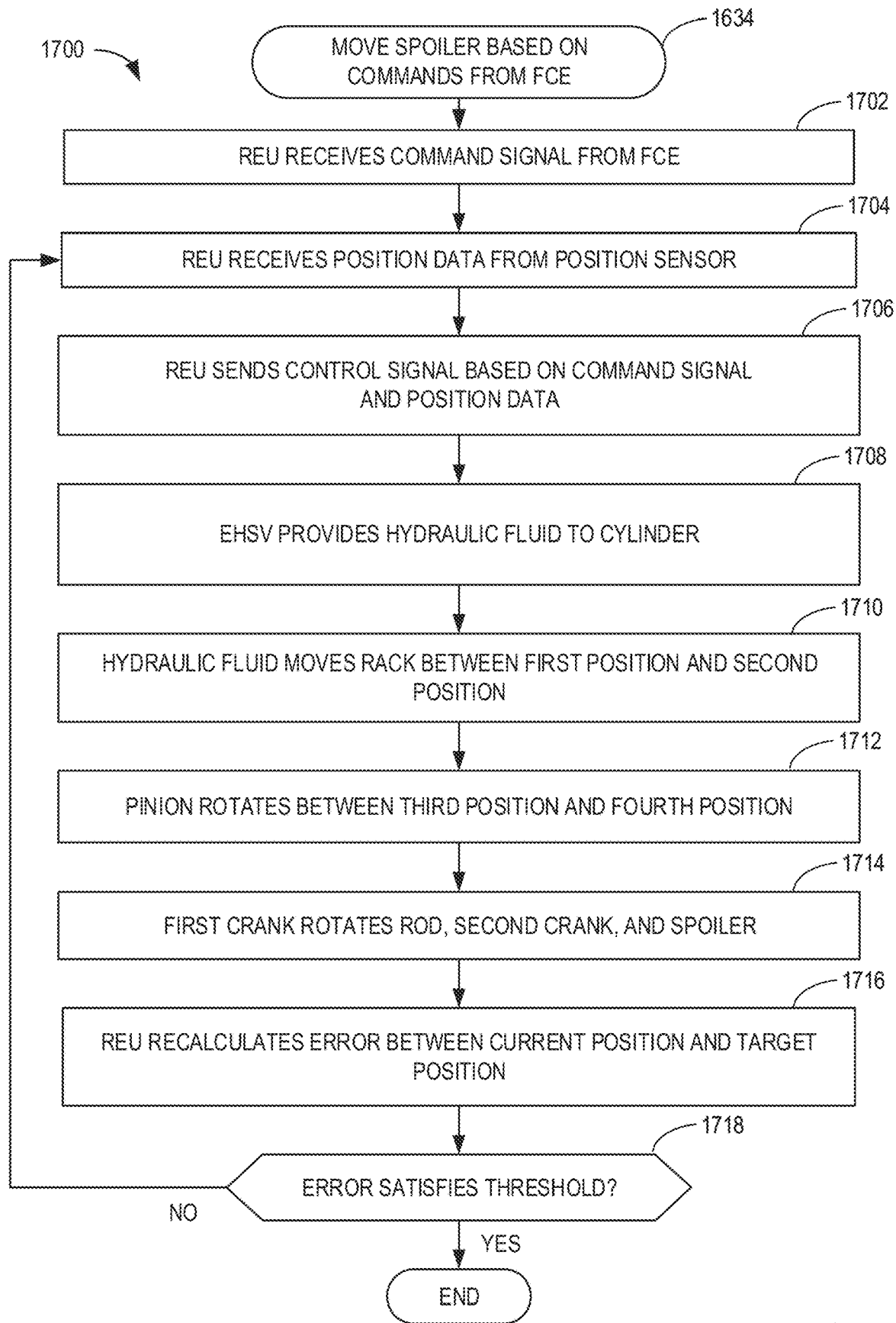
FIG. 17 is a flowchart representative of an example process which may be executed by the spoiler actuation system of FIGS. 8A, 8B, 9, 11, and/or 12 to move the spoiler based on commands from example flight control electronics (FCE).
Figure 18:
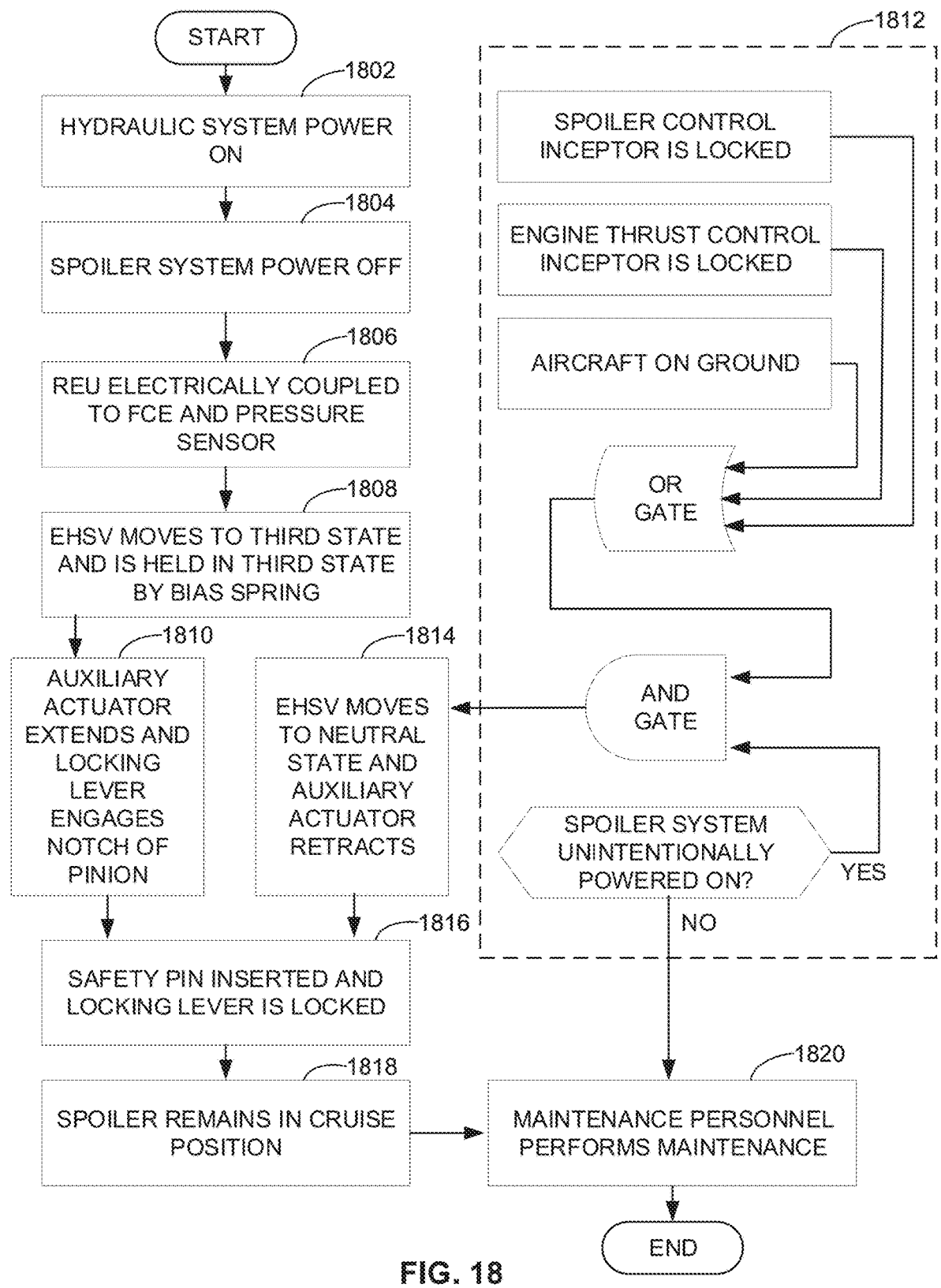
FIG. 18 is a flowchart representative of an example process which may be executed by the spoiler actuation system of FIGS. 8A, 8B, 9, 11, and/or 12 when maintenance is to be performed on or near the spoiler.

Flowcharts representative of example hardware logic, machine readable instructions, hardware implemented state machines, and/or any combination thereof for implementing the REU 804 of FIG. 14 are shown in FIGS. 16-18. The machine readable instructions may be one or more executable programs or portion(s) of an executable program for execution by a computer processor and/or processor circuitry, such as the processor 1912 shown in the example processor platform 1900 discussed below in connection with FIG. 19. The program may be embodied in software stored on a non-transitory computer readable storage medium such as a CD-ROM, a floppy disk, a hard drive, a DVD, a Blu-ray disk, or a memory associated with the processor 1912, but the entire program and/or parts thereof could alternatively be executed by a device other than the processor 1912 and/or embodied in firmware or dedicated hardware. Further, although the example programs are described with reference to the flowcharts illustrated in FIGS. 16-18, many other methods of implementing the example REU 804 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 16-18 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 16 is a flowchart representative of an example process 1600 which may be executed by the spoiler actuation system 600 of FIGS. 8A, 8B, 9, 11, and/or 12 to move the spoiler 112 between the cruise position and the upward position. The example process 1600 of FIG. 16 begins at block 1602, at which the hydraulic system 802 of FIGS. 8A, 8B, 9, 11, and/or 12 is powered on. For example, the hydraulic system 802, when powered on, provides hydraulic fluid to the HCM 608 of FIGS. 8A, 8B, 9, 11, and/or 12 via the first piping 826.

At block 1604, the spoiler actuation system 600 is powered on. For example, the REU 804 and the FCE 810 of FIGS. 8A, 8B, 9, 11, and/or 12 are powered on.

At block 1606, the FCE 810 and the REU 804 are electrically and/or communicatively coupled. For example, the FCE 810 and the REU 804 are coupled via the second wired connection 812 to sends one or more signals therebetween.

At block 1608, the pressure sensor 816 and the rotary position sensor 622 FIGS. 8A, 8B, 9, 11, and/or 12 are electrically and/or communicatively coupled to the REU 804. For example, the rotary position sensor 622 is electrically and/or communicatively coupled to the REU 804 via the third wired connection 814, and the pressure sensor 816 is electrically and/or communicatively coupled to the REU 804 via the fourth wired connection 818.

At block 1610, the aircraft 100 of FIG. 1 is in flight and the REU 804 determines whether a hydraulic pressure is above a threshold. For example, the REU 804 receives pressure data from the pressure sensor 816, and determines the hydraulic pressure in the first piping 826 based on the pressure data. In response to the REU 804 determining that the hydraulic pressure is above the threshold (e.g., block 1610 returns a result of YES), the process proceeds to block 1628. Alternatively, in response to the REU 804 determining that the hydraulic pressure is not above the threshold (e.g., block 1610 returns a result of NO), the process proceeds to block 1612.

At block 1612, the REU 804 de-energizes the SOV 806 and the EHSV 820 of FIGS. 8A, 8B, 9, 11, and/or 12. For example, the REU 804 sends a second control signal to the SOV 806 to cause the SOV 806 to switch to a second state shown in FIGS. 11 and/or 12. In some examples, the SOV 806 is biased to the second state when a signal is not present between the REU 804 and the SOV 806. In such examples, the REU 804 causes the SOV 806 to switch to the second state by stopping a current flow to the SOV 806 via the first wired connection 808.

At block 1614, the auxiliary actuator 832 is extended. For example, in response to the SOV 806 in the second state preventing flow of hydraulic fluid to the auxiliary actuator 832, a pressure in the first chamber 1008 of the auxiliary actuator 832 of FIG. 10A. is reduced. As such, the mechanical spring 835 of FIG. 10A causes the auxiliary actuator 832 to move to an extended position.

At block 1616, the auxiliary actuator 832 rotates the locking lever 836 of FIGS. 8A, 8B, 9, 11, and/or 12 clockwise. For example, the auxiliary actuator 832 in the extended position pushes upward on the locking lever 836 to cause the lever to rotate clockwise about the pivot bolt 1018 of FIG. 10A.

At block 1618, the EHSV 820 switches to a third state of FIGS. 11 and/or 12. For example, the REU 804 deactivates control signals sent via the fifth and sixth wired connections 822, 824 to the EHSV 820. The bias spring 1120 of FIG. 11 causes the EHSV 820 to switch to the third state. In some examples, the EHSV 820 is spring-biased to the third state when a signal from the REU 804 is not present via the fifth and sixth wired connections 822, 824. In such examples, the REU 804 causes the EHSV 820 to switch to the third state by stopping a flow of current to the EHSV 820.

At block 1620, the second chamber 842 of the cylinder 606 of FIGS. 8A, 8B, 9, 11, and/or 12 is fluidly coupled to a hydraulic supply line. For example, the EHSV 820 in the third state fluidly couples the first piping 826 to the fourth piping 844, such that hydraulic fluid from the hydraulic system 802 can flow to the second chamber 842 via the EHSV 820.

At block 1622, the rack 604 of FIGS. 8A, 8B, 9, 11, and/or 12 moves leftward and causes the spoiler 112 to move downward. For example, in response the hydraulic fluid being provided to the second chamber 842, a hydraulic pressure in the second chamber 842 causes the rack 604 to move leftward, thereby causing the pinion 602 to rotate clockwise. Rotation of the pinion 602 causes corresponding rotation of the first crank 610, the second crank 612, and the rod 614 to cause the spoiler 112 to move downward toward the cruise position.

At block 1624, the locking lever 836 engages with a notch of the pinion 602. For example, as a result of the locking lever 836 rotating clockwise, the locking lever 836 locks the pinion 602 to prevent counterclockwise rotation thereof.

At block 1626, the spoiler 112 is held in the cruise position. For example, the spoiler 112 is prevented from traveling upward when the locking lever 836 is engaged with a notch of the pinion. The process ends and the spoiler 112 remains at the cruise position when the aircraft 100 is in flight.

Returning to block 1628, in response to the REU 804 determining that the hydraulic pressure in the first piping 826 is above the threshold, the REU 804 energizes the SOV 806. For example, the REU 804 sends a first control signal to the SOV 806 to cause the SOV 806 to switch to a first state shown in FIGS. 8A, 8B, and/or 9. In some examples, the SOV 806 is biased to the second state when a signal is not present between the REU 804 and the SOV 806. In such examples, the REU 804 causes the SOV 806 to switch to the first state by enabling a current flow to the SOV 806 via the first wired connection 808.

At block 1630, the auxiliary actuator 832 is retracted. For example, in response to the SOV 806 in the first state providing hydraulic fluid to the auxiliary actuator 832, a pressure in the first chamber 1008 of the auxiliary actuator 832 increases. As such, the pressure in the first chamber 1008 overcomes a force of the mechanical spring 835 to cause the auxiliary actuator 832 to move to a retracted position.

At block 1632, the torsion spring 1016 of FIG. 10A causes the locking lever 836 to rotate counterclockwise about the pivot bolt 1018. For example, the locking lever 836 rotates away from the pinion 602, thus allowing the pinion 602 to rotate freely about the pinion axis 702.

At block 1634, the spoiler actuation system 600 moves the spoiler 112 based on commands from the FCE 810 as described in connection with FIG. 17 below.

FIG. 17 is a flowchart representative of an example process 1700 which may be executed by the spoiler actuation system 600 of FIGS. 8A, 8B, 9, 10, and/or 11 to move the spoiler 112 based on commands from the FCE 810 in association with block 1634 of FIG. 16. The example process 1700 of FIG. 17 begins as the hydraulic system 802 is operating under normal hydraulic operating conditions and the auxiliary actuator 832 is in the retracted position.

At block 1702, the REU 804 receives a command signal from the FCE 810. For example, the signal receiver 1402 of the REU 804 receives the command signal via the second wired connection 812 of FIGS. 8A, 8B, and/or 9. In some examples, the command signal corresponds to a desired position of the spoiler 112.

At block 1704, the REU 804 receives position data from the rotary position sensor 622. For example, the signal receiver 1402 of the REU 804 receives the position data via the third wired connection 814. In some examples, the position data includes angular position of the pinion 602 and/or linear travel of the rack 604.

At block 1706, the REU 804 sends a control signal to the EHSV 820 based on the command signal from the FCE 810 and the position data from the rotary position sensor 622. For example, the position determiner 1406 of the REU 804 determines the desired position of the spoiler 112 based on the command signal, and further determines a target position of the pinion 602 corresponding to the desired position of the spoiler 112. The position determiner 1406 determines a current position of the pinion 602 based on the position data. In this example, the position controller 1410 of the REU 804 selects a control signal based on an error between the target position and the current position. For example, the position controller 1410 selects a fourth control signal when the pinion 602 is to rotate counterclockwise from the current position to the target position, and selects a third control signal when the pinion 602 is to rotate clockwise from the current position to the target position. In this example, the signal transmitter 1404 of the REU 804 sends the selected control signal (e.g., the third signal or the fourth control signal) to the EHSV 820 via the fifth wired connection 822 and/or the sixth wired connection 824.

At block 1708, the EHSV 820 provides hydraulic fluid to the cylinder 606. For example, the EHSV 820 switches to a third state in response to receiving the third control signal, where the EHSV 820 in the first state provides fluid from the hydraulic system 802 to the second chamber 842 of the cylinder 606. Alternatively, the EHSV 820 switches to a fourth state in response to receiving the fourth control signal, where the EHSV 820 in the fourth state provides fluid from the hydraulic system 802 to the first chamber 838 of the cylinder 606.

At block 1710, the hydraulic fluid in the cylinder 606 moves the rack 640 between a first position and a second position. For example, the hydraulic fluid in the first chamber 838 applies hydraulic pressure on the first piston 848 to cause the rack 604 to move in a rightward direction in the illustrated examples of FIGS. 8A, 8B, 9, 11, and/or 12. Alternatively, the hydraulic fluid in the second chamber 842 applies hydraulic pressure on the second piston 850 to cause the rack 604 to move in a leftward direction in the illustrated examples of FIGS. 8A, 8B, 9, 11, and/or 12.

At block 1712, the pinion 602 rotates between a third position and a fourth position. For example, the pinion 602 rotates counterclockwise toward the fourth position when the rack 604 moves in the rightward direction. Alternatively, the pinion 602 rotates clockwise toward the third position when the rack 604 moves in the leftward direction.

At block 1714, the first crank 610 rotates the rod 614, the second crank 612, and, thus, the spoiler 112. For examples, when the pinion 602 rotates in the counterclockwise direction, the first crank 610 rotates counterclockwise with the pinion 602 and causes the rod 614, the second crank 612, and the spoiler 112 move upward toward the upward position. Alternatively, when the pinion 602 rotates in the clockwise direction, the first crank 610 rotates clockwise with the pinion 602 and causes the rod 614, the second crank 612, and the spoiler 112 move downward toward the cruise position.

At block 1716, the REU 804 recalculates the error between the current position and the target position. For example, the signal receiver 1402 receives updated position data from the rotary position sensor 622, and the position determiner 1406 determines the current position of the pinion 602 based on the updated position data. In such an example, the position controller 1410 recalculates the error between the updated current position and the target position.

At block 1718, the REU 804 determines whether the error satisfies an error threshold. For example, in response to the position controller 1410 determining that the error does not satisfy the error threshold (e.g., block 1718 returns a result of NO), the process returns to block 1704. Alternatively, in response to the position controller 1410 determining that the error satisfies the error threshold (e.g., block 1718 returns a result of YES), the process ends.

FIG. 18 is a flowchart representative of an example maintenance process 1800 which may be executed by maintenance personnel and by the spoiler actuation system 600 of FIGS. 8A, 8B, 9, 11, and/or 12 when maintenance is to be performed on or near the spoiler 112 and the aircraft 100 is on the ground. The maintenance process 1800 begins at block 1802, at which the hydraulic system 802 of FIGS. 8A, 8B, 9, 11, and/or 12 is powered on. For example, the hydraulic system 802, when powered on, provides hydraulic fluid to the HCM 608 of FIGS. 8A, 8B, 9, 11, and/or 12 via the first piping 826.

At block 1804, the spoiler actuation system 600 is powered off. For example, the spoiler actuation system 600, when powered off, prevents the spoiler actuation system 600 from moving the spoiler 112 upward.

At block 1806, the REU 804 is electrically coupled to the FCE 810 and to the pressure sensor 816. For example, the REU 804 is electrically and/or communicatively coupled to the FCE 810 via the second wired connection 812, and the REU 804 is electrically and/or communicatively coupled to the pressure sensor 816 via the fourth wired connection 818.

At block 1808, the EHSV 820 of FIGS. 8A, 8B, 9, 11, and/or 12 moves to the third state and the bias spring 1120 holds the EHSV 820 in the third state.

At block 1810, the auxiliary actuator 832 extends and the locking lever 836 engages with a notch of the pinion 602. For example, when the auxiliary actuator 832 extends, the follower 1012 causes the locking lever 836 to rotate toward the pinion 602 until the locking lever 836 engages the notch of the pinion 602.

At block 1812, the FCE 810 determine whether a condition of the aircraft 100 is satisfied and the spoiler actuation system 600 has been unintentionally powered on. For example, the FCE 810 determine that the condition is satisfied in response to determining that at least one of a spoiler control inceptor in the cockpit 120 of the aircraft 100 is locked, an engine thrust control inceptor in the cockpit 120 is locked, or the aircraft 100 is on the ground. In response to the FCE 810 determining that the condition is satisfied and the spoiler actuation system 600 has been unintentionally powered on, the process proceeds to block 1814. Alternatively, in response to the FCE 810 determining that the spoiler actuation system 600 has not been powered on, the process proceeds to block 1820.

At block 1814, the EHSV 820 moves to the neutral state and the auxiliary actuator 832 retracts. For example, the REU 804 sends the fifth control signal to the EHSV 820 to cause the EHSV 820 to switch to the neutral state of FIG. 8A. When the EHSV 820 is in the neutral state, the EHSV 820 prevents hydraulic fluid from flowing to the first chamber 838 and the second chamber 842 from the hydraulic system 802.

At block 1816, the safety pin 1110 is inserted into the locking lever 836 and the locking lever 836 is locked. For example, the maintenance personnel inserts the safety pin 1110 into the locking lever 836 to prevent rotation of the locking lever 836 about the pivot bolt 1018. In some examples, the locking lever 836 is locked when the auxiliary actuator 832 is extended and the safety pin is inserted into the locking lever 832.

At block 1818, the spoiler 112 remains in the cruise position. For example, the EHSV 820 in the neutral state prevents hydraulic fluid from flowing into the first chamber 838 and the second chamber 842, thereby preventing upward travel of the spoiler 112.

At block 1820, the maintenance personnel performs maintenance on and/or near the spoiler 112. For example, the maintenance personnel can safely perform one or more maintenance tasks when the spoiler 112 is prevented from travelling upward.

Figure 19:
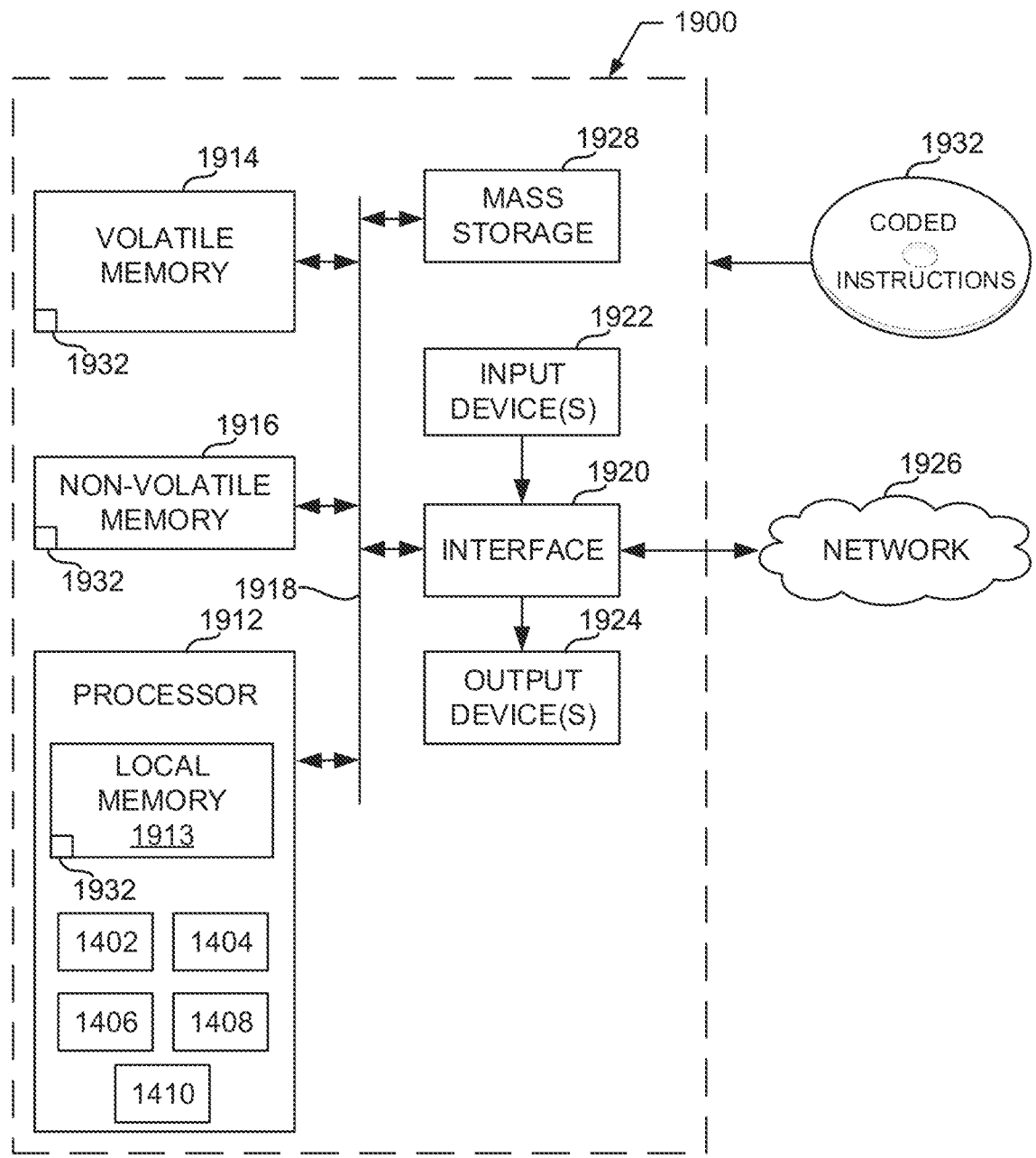
FIG. 19 is a block diagram of an example processing platform structured to execute the instructions of FIGS. 16-18 to implement the REU of FIG. 14.

FIG. 19 is a block diagram of an example processor platform 1900 structured to execute the instructions of FIGS. 16-18 to implement the REU 804 of FIG. 14. The processor platform 1900 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1900 of the illustrated example includes a processor 1912. The processor 1912 of the illustrated example is hardware. For example, the processor 1912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the signal receiver 1402, the signal transmitter 1404, the position determiner 1406, the pressure determiner 1408, and the position controller 1410.

The processor 1912 of the illustrated example includes a local memory 1913 (e.g., a cache). The processor 1912 of the illustrated example is in communication with a main memory including a volatile memory 1914 and a non-volatile memory 1916 via a bus 1918. The volatile memory 1914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1916 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), a Bluetooth® interface, a near field communication (NFC) interface, and/or a PCI express interface.

In the illustrated example, one or more input devices 1922 are connected to the interface circuit 1920. The input device(s) 1922 permit(s) a user to enter data and/or commands into the processor 1912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1924 are also connected to the interface circuit 1920 of the illustrated example. The output devices 1924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1920 of the illustrated example, thus, typically includes a graphics driver card, a graphics driver chip and/or a graphics driver processor.

The interface circuit 1920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, redundant array of independent disks (RAID) systems, and digital versatile disk (DVD) drives.

The machine executable instructions 1932 of FIG. 19 may be stored in the mass storage device 1928, in the volatile memory 1914, in the non-volatile memory 1916, and/or on a removable non-transitory computer readable storage medium such as a CD or DVD.

From the foregoing, it will be appreciated that example methods, apparatus and articles of manufacture have been disclosed that provide spoiler actuation for an aircraft using hydraulic fluid. The disclosed methods, apparatus and articles of manufacture improve the efficiency of aircraft by reducing space required to implement examples disclosed herein, thereby enabling an increase in size of a spar box and, thus, an increase in fuel capacity of the aircraft. The disclosed methods, apparatus and articles of manufacture also prevent upward travel of the spoiler during failure of a hydraulic system of the aircraft, thus reducing drag and increasing aircraft performance range.

Example 1 includes an aircraft including a wing, a spoiler rotatably coupled to the wing, the spoiler movable between a cruise position and an upward position and between the cruise position and a droop position, and a spoiler actuation system coupled to a hydraulic system of the aircraft, the spoiler actuation system including a first piston and a second piston, a rack coupled between the first piston and the second piston, the rack movable between a first position and a second position, a pinion coupled to the rack, the pinion to rotate between a third position and a fourth position when the rack moves between the first position and the second position, a first crank arm coupled to the pinion, the first crank arm to rotate with the pinion between the third position and the fourth position, and a second crank arm coupled to the first crank arm and to the spoiler, the second crank arm to move the spoiler between the cruise position and the upward position when the first crank arm rotates between the third position and the fourth position.

Example 2 includes the aircraft of Example 1, wherein the spoiler actuation system includes a hydraulic control module (HCM), the HCM to control hydraulic fluid from the hydraulic system, the HCM including a pressure sensor, a servo-valve, and a solenoid valve.

Example 3 includes the aircraft of Example 2, where the pressure sensor, the servo-valve and the solenoid valve are operatively coupled to a remote electronic unit (REU), the REU to send a control signal to the servo-valve, the servo-valve to switch between a first state, a second state, and a third state in response to the control signal, the servo-valve to prevent flow of hydraulic fluid therethrough in the first state, the servo-valve to direct the hydraulic fluid from the hydraulic system toward the first piston in the second state, and the servo-valve to direct the hydraulic fluid toward the second piston in the third state.

Example 4 includes the aircraft of Example 3, where the first piston moves the rack to the first position in response to the servo-valve being in the second state, and the second piston moves the rack to the second position in response to the servo-valve being in the third state.

Example 5 includes the aircraft of Example 3, further including an actuator fluidly coupled to the solenoid valve, the actuator to move to an extended position in response to a pressure of the hydraulic fluid being less than a pressure threshold, a spring of the actuator to hold the actuator in the extended position when the pressure is less than the pressure threshold, the actuator to prevent rotation of the pinion when the actuator is in the extended position.

Example 6 includes the aircraft of Example 3, where the spoiler actuation system includes a rotary position sensor operatively coupled to the pinion and communicatively coupled to the REU, the rotary position sensor to gather position data corresponding to the pinion, the position data to include an angular position of the pinion, and transmit the position data to the REU in response to a request from the REU.

Example 7 includes the aircraft of Example 6, further including flight control electronics (FCE) communicatively coupled to the REU, the FCE to send a command signal to the REU, the REU to send the control signal to the servo-valve in response to receiving the command signal.

Example 8 includes the aircraft of Example 7, where the REU determines a current position of the pinion based on the command signal, and determines a target position of the pinion based on the position data.

Example 9 includes the aircraft of Example 8, where the REU calculates an error between the current position and the target position, the REU to select the control signal based on the error.

Example 10 includes a method including receiving a command signal from flight control electronics (FCE) of an aircraft at a remote electronic unit (REU), in response to receiving the command signal at the REU, switching a servo-valve from a neutral state to a first state or from the neutral state to a second state via a control signal from the REU, in response to the servo-valve switching to the second state, providing hydraulic fluid from the servo-valve to a piston coupled to a rack, the rack to move from a first position to a second position in response to the providing of the hydraulic fluid to the piston, rotating a pinion from a third position to a fourth position when the rack moves from the first position to the second position, the pinion to cause corresponding rotation of a first crank arm, rotating a second crank arm coupled to the first crank arm, and moving a spoiler of the aircraft from a cruise position to an upward position when rotating the second crank arm.

Example 11 includes the method of Example 10, further including measuring, using a rotary position sensor, an angular position of the pinion and transmitting a value of the angular position to the REU.

Example 12 includes the method of Example 11, further including transmitting the control signal from the REU to the servo-valve based on the command signal from the FCE and the angular position of the pinion.

Example 13 includes the method of Example 10, where the piston is a first piston, and further including providing the hydraulic fluid to the first piston when the servo-valve is the first state, and providing the hydraulic fluid to a second piston when the servo-valve is in the second state, the first and second pistons coupled to the rack at opposite ends of the rack.

Example 14 includes the method of Example 13, further including preventing flow of the hydraulic fluid from the servo-valve to the first piston in response to at least one of two electrical controls of the servo-valve being de-activated or a pressure of the hydraulic fluid being less than a pressure threshold.

Example 15 includes the method of Example 14, further including causing the spoiler to move from the upward position to the cruise position in response to at least one of the two electrical controls of the servo-valve being de-activated or the pressure of the hydraulic fluid being less than the pressure threshold.

Example 16 includes the method of Example 15, further including preventing, using a locking lever, rotation of the pinion and holding the spoiler in the cruise position.

Example 17 includes an apparatus including a first piston and a second piston, a rack coupled between the first piston and the second piston, the rack movable between a first position and a second position within a cylinder, a pinion coupled to the rack, the pinion to rotate between a third position and a fourth position when the rack moves between the first position and the second position, a first crank arm coupled to the pinion, the first crank arm to rotate with the pinion between the third position and the fourth position, and a second crank arm coupled to the first crank arm and to a spoiler of an aircraft, the second crank arm to move the spoiler between a cruise position and an upward position when the pinion rotates between the third position and the fourth position.

Example 18 includes the apparatus of Example 17, further including a rod rotatably coupled between the first and second crank arms.

Example 19 includes the apparatus of Example 17, where the rack translates in a first plane and the spoiler rotates in a second plane, the first plane perpendicular to the second plane.

Example 20 includes the apparatus of Example 17, where the cylinder is fluidly couplable to a hydraulic system, the hydraulic system to provide hydraulic fluid to at least one of the first piston or the second piston to move the rack between the first position and the second position.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An aircraft comprising:
   a wing;
   a spoiler rotatably coupled to the wing, the spoiler movable between a cruise position and an upward position and between the cruise position and a droop position; and
   a spoiler actuation system coupled to a hydraulic system of the aircraft, the spoiler actuation system including:
      a first piston and a second piston;
      a rack coupled between the first piston and the second piston, the rack movable between a first position and a second position;
      a pinion coupled to the rack, the pinion to rotate between a third position and a fourth position when the rack moves between the first position and the second position;
      a first crank arm coupled to the pinion, the first crank arm to rotate with the pinion between the third position and the fourth position; and
      a second crank arm coupled to the first crank arm and to the spoiler, the second crank arm to move the spoiler between the cruise position and the upward position when the first crank arm rotates between the third position and the fourth position.

2. The aircraft of claim 1, wherein the spoiler actuation system includes a hydraulic control module (HCM), the HCM to control hydraulic fluid from the hydraulic system, the HCM including a pressure sensor, a servo-valve, and a solenoid valve.

3. The aircraft of claim 2, wherein the pressure sensor, the servo-valve and the solenoid valve are operatively coupled to a remote electronic unit (REU), the REU to send a control signal to the servo-valve, the servo-valve to switch between a first state, a second state, and a third state in response to the control signal, the servo-valve to prevent flow of hydraulic fluid therethrough in the first state, the servo-valve to direct the hydraulic fluid from the hydraulic system toward the first piston in the second state, and the servo-valve to direct the hydraulic fluid toward the second piston in the third state.

4. The aircraft of claim 3, wherein the first piston moves the rack to the first position in response to the servo-valve being in the second state, and the second piston moves the rack to the second position in response to the servo-valve being in the third state.

5. The aircraft of claim 3, further including an actuator fluidly coupled to the solenoid valve, the actuator to move to an extended position in response to a pressure of the hydraulic fluid being less than a pressure threshold, a spring of the actuator to hold the actuator in the extended position when the pressure is less than the pressure threshold, the actuator to prevent rotation of the pinion when the actuator is in the extended position.

6. The aircraft of claim 3, wherein the spoiler actuation system includes a rotary position sensor operatively coupled to the pinion and communicatively coupled to the REU, the rotary position sensor to:
   gather position data corresponding to the pinion, the position data to include an angular position of the pinion; and
   transmit the position data to the REU in response to a request from the REU.

7. The aircraft of claim 6, further including flight control electronics (FCE) communicatively coupled to the REU, the FCE to send a command signal to the REU, the REU to send the control signal to the servo-valve in response to receiving the command signal.

8. The aircraft of claim 7, wherein the REU determines a current position of the pinion based on the command signal, and determines a target position of the pinion based on the position data.

9. The aircraft of claim 8, wherein the REU calculates an error between the current position and the target position, the REU to select the control signal based on the error.

10. A method comprising:
receiving a command signal from flight control electronics (FCE) of an aircraft at a remote electronic unit (REU);
in response to receiving the command signal at the REU, switching a servo-valve from a neutral state to a first state or from the neutral state to a second state via a control signal from the REU;
in response to the servo-valve switching to the second state, providing hydraulic fluid from the servo-valve to a piston coupled to a rack, the rack to move from a first position to a second position in response to the providing of the hydraulic fluid to the piston;
rotating a pinion from a third position to a fourth position when the rack moves from the first position to the second position, the pinion to cause corresponding rotation of a first crank arm;
rotating a second crank arm coupled to the first crank arm; and
moving a spoiler of the aircraft from a cruise position to an upward position when rotating the second crank arm.

11. The method of claim 10, further including measuring, using a rotary position sensor, an angular position of the pinion and transmitting a value of the angular position to the REU.

12. The method of claim 11, further including transmitting the control signal from the REU to the servo-valve based on the command signal from the FCE and the angular position of the pinion.

13. The method of claim 10, wherein the piston is a first piston, and further including providing the hydraulic fluid to the first piston when the servo-valve is the first state, and providing the hydraulic fluid to a second piston when the servo-valve is in the second state, the first and second pistons coupled to the rack at opposite ends of the rack.

14. The method of claim 13, further including preventing flow of the hydraulic fluid from the servo-valve to the first piston in response to at least one of two electrical controls of the servo-valve being de-activated or a pressure of the hydraulic fluid being less than a pressure threshold.

15. The method of claim 14, further including causing the spoiler to move from the upward position to the cruise position in response to at least one of the two electrical controls of the servo-valve being de-activated or the pressure of the hydraulic fluid being less than the pressure threshold.

16. The method of claim 15, further including preventing, using a locking lever, rotation of the pinion and holding the spoiler in the cruise position.

17. An apparatus comprising:
a first piston and a second piston;
a rack coupled between the first piston and the second piston, the rack movable between a first position and a second position within a cylinder;
a pinion coupled to the rack, the pinion to rotate between a third position and a fourth position when the rack moves between the first position and the second position;
a first crank arm coupled to the pinion, the first crank arm to rotate with the pinion between the third position and the fourth position; and
a second crank arm coupled to the first crank arm and to a spoiler of an aircraft, the second crank arm to move the spoiler between a cruise position and an upward position when the pinion rotates between the third position and the fourth position.

18. The apparatus of claim 17, further including a rod rotatably coupled between the first and second crank arms.

19. The apparatus of claim 17, wherein the rack translates in a first plane and the spoiler rotates in a second plane, the first plane perpendicular to the second plane.

20. The apparatus of claim 17, wherein the cylinder is fluidly couplable to a hydraulic system, the hydraulic system to provide hydraulic fluid to at least one of the first piston or the second piston to move the rack between the first position and the second position.

* * * * *